United States Patent [19]

Bryant et al.

[11] Patent Number: 5,255,257
[45] Date of Patent: Oct. 19, 1993

[54] FREQUENCY, PHASE AND AMPLITUDE CONTROL APPARATUS AND METHOD FOR ACOUSTO-OPTIC DEFLECTOR OPTIMIZATION

[75] Inventors: Lawrence M. Bryant, 3951 Duncan Pl., Palo Alto, Calif. 94306; James W. Dickson, 363 Carroll St., Sunnyvale, Calif. 94086; David R. Rodal, Palo Alto, Calif.

[73] Assignees: Lasertape Systems, Inc.; Lawrence M. Bryant; James W. Dickson, San Bruno, Calif.

[21] Appl. No.: 846,529

[22] Filed: Mar. 4, 1992

[51] Int. Cl.⁵ .......................... G11B 3/74; G11B 7/00
[52] U.S. Cl. ........................................ 369/121; 331/2
[58] Field of Search ................ 369/121, 122, 116; 331/2

[56] References Cited

U.S. PATENT DOCUMENTS

| | | | |
|---|---|---|---|
| 4,005,275 | 1/1977 | Coppock | 369/121 |
| 4,295,162 | 10/1981 | Carlsen | 369/121 |
| 5,138,603 | 8/1992 | Narahara et al. | 369/121 |

*Primary Examiner*—Paul M. Dzierzynski
*Assistant Examiner*—Kiet T. Nguyen
*Attorney, Agent, or Firm*—Blakely, Sokoloff, Taylor & Zafman

[57] ABSTRACT

An electronic circuit is described which will allow an acoustoptic deflector to be used in multi-frequency mode at high power levels with a minimum amount of intermodulation between each frequency. Reduction of interference between multiple separate signal frequencies is achieved by precise control of the individual phasing of each separate frequency relative to a common reference frequency. The relative phase of each frequency is also controlled so that a low maximum power is achieved for the combined signal that is presented to the acousto-optic deflector without decreasing the overall average power of the multiple signal frequencies. The present invention is useful in systems such as optical data storage on tape or disk, optical printing and imaging, and acousto-optic signal or information processing.

43 Claims, 11 Drawing Sheets

132 - Optical Tape Recorder
133 - Control Computer System

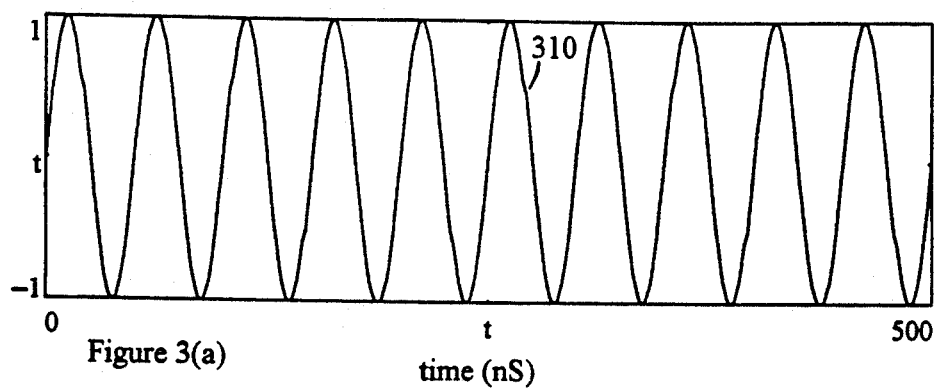
Figure 3(a)
time (nS)
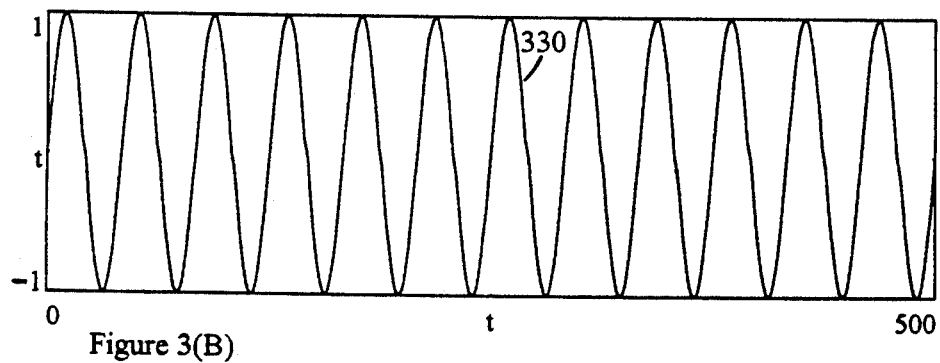
Figure 3(B)
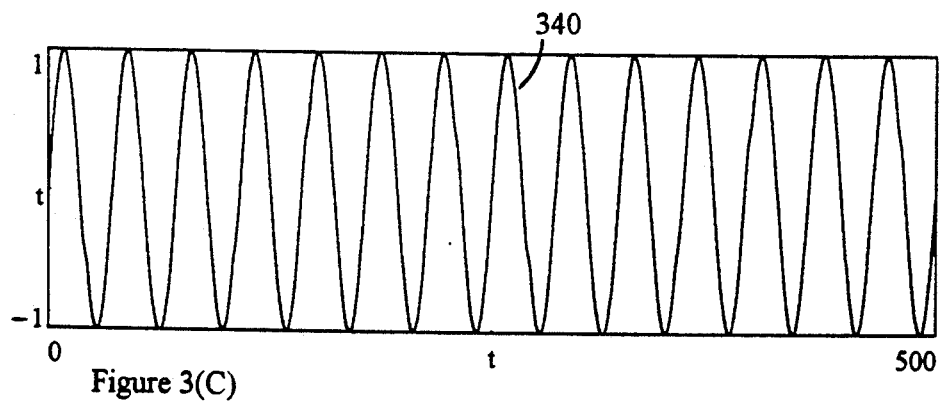
Figure 3(C)
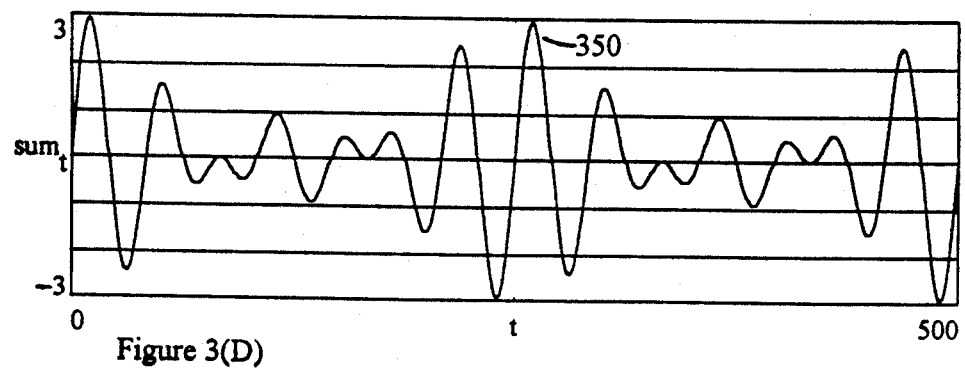
Figure 3(D)
FIGURE 3

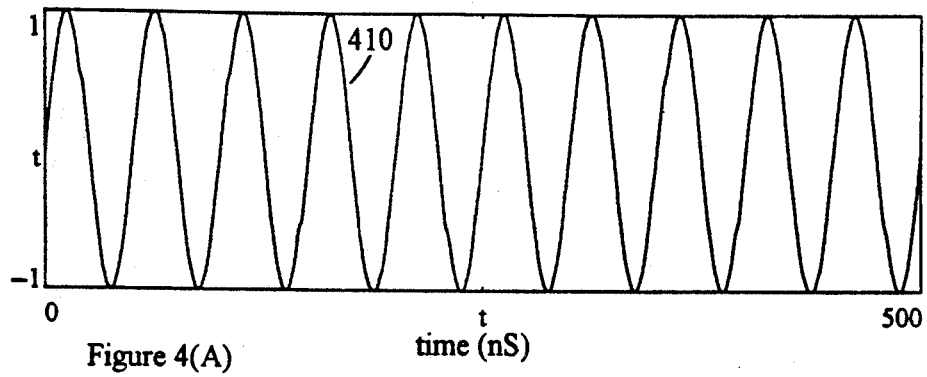
Figure 4(A)    time (nS)
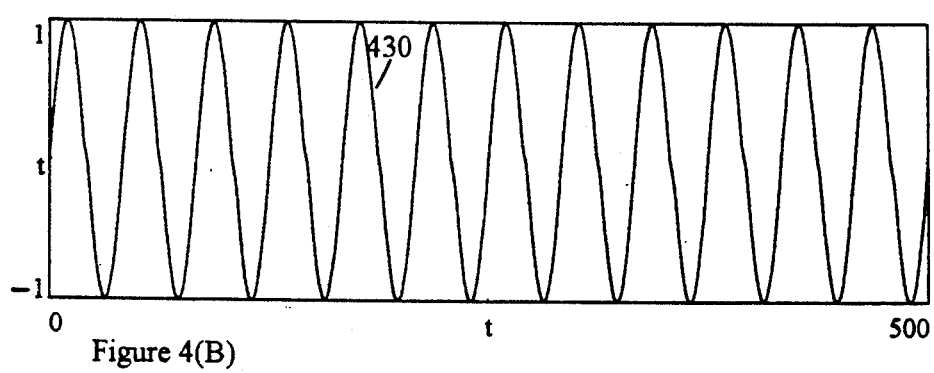
Figure 4(B)
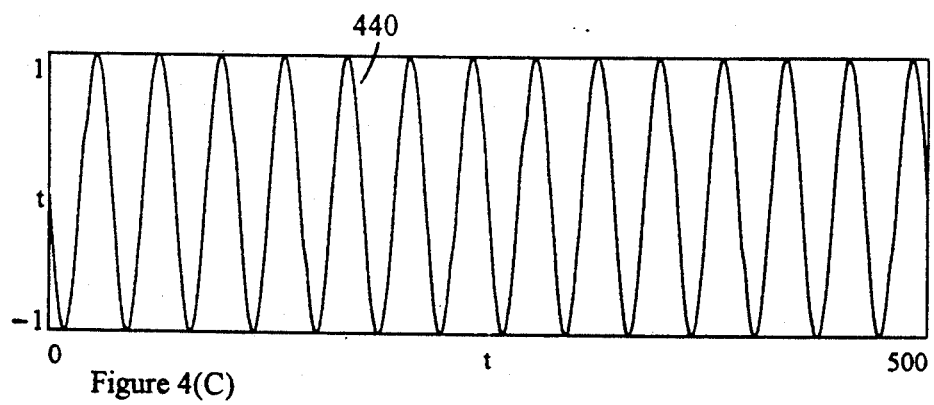
Figure 4(C)
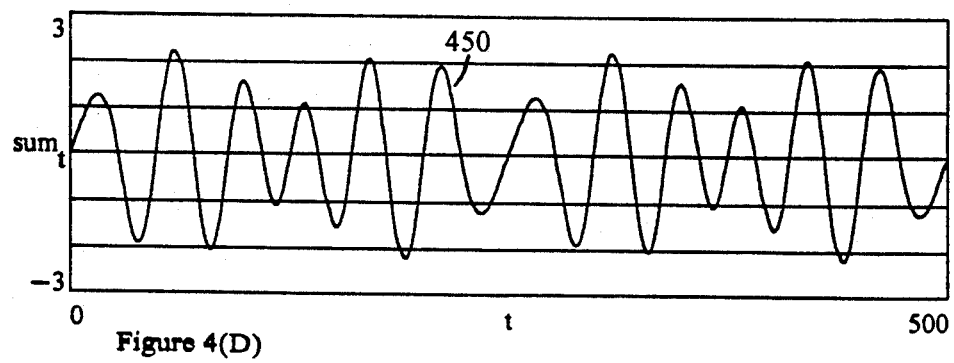
Figure 4(D)
FIGURE 4

FREQUENCY, PHASE AND AMPLITUDE CONTROL APPARATUS AND METHOD FOR ACOUSTO-OPTIC DEFLECTOR OPTIMIZATION

BACKGROUND OF THE INVENTION (1) Incorporation by Reference of Related Application The following related copending application, Ser. No. 07/796,461, filed on Nov. 22, 1991, entitled Multi-frequency Parallel Read-Write Optical Tape Recording System and assigned to the assignee of the present invention is incorporated by reference for its teachings of the environment in which the present invention has advantageous use. The above referenced application, Ser. No. 07/796,461, is a continuation-in-part of U.S. patent application Ser. No. 07/548,106, now abandoned, filed Jul. 5, 1990 titled Linear Digital Tape Recorder, which is assigned to the assignee of the present invention and which is a continuation-in-part of U.S. patent application Ser. No. 07/480,646, now abandoned filed Feb. 15, 1990, titled Multiple Source Optical Tape Recorder, which is assigned to the assignee of the present invention and which is a continuation-in-part of co-pending U.S. patent application Ser. No. 07/405,948, now U.S. Pat. No. 5,120,136, filed Sep. 12, 1989, titled Optical Tape Recorder, also assigned to the assignee of the present invention.

The present invention further relates to U.S. patent application Ser. No. 07/613,396 filed Nov. 15, 1990 titled Chirp Compensation for Acousto-optic Deflection System, which application is assigned to the assignee of the present invention.

(2) Field of the Invention

This invention relates to a phase and amplitude control circuit for signal frequencies used as input to an acousto-optic deflector. More particularly, this invention relates to systems using acousto-optic deflectors for deflection of beams of light in various applications such as optical data storage on tape or disk, optical printing and imaging, and acousto-optic signal or information processing.

(3) Prior Art

Acousto-optic deflectors (AODs) can be used for deflecting light sources in various applications such as optical data storage on tape or disk, optical printing and imaging, and acousto-optic signal or information processing. In such devices an acoustic wave is generated from an electrical signal by an electro-mechanical transducer attached to one end of an acoustic medium which has an acoustic termination at the other end to suppress reflected acoustic waves. A source of light is collimated and directed such that it passes through a region of the acoustic medium which contains the acoustic waves resulting in a portion of this light beam being deflected by interference with the acoustic waves.

It is well known that a collimated optical beam properly directed through an AOD will be deflected through an angle proportional to the frequency of the electrical signal input to the AOD. (A reference on this subject generally is entitled, "Acousto-Optic Signal Processing", by Norman J. Berg, and John N. Lee, Marcel Dekker, Inc., New York, TA1770.A225, 1983, ISBN 0-8247-1667-1.) Furthermore, an input signal consisting of a sum of multiple frequencies will result in multiple deflected beams being output from the AOD with each separate beam corresponding to one of the original input frequencies that were summed. Additionally, the intensity of each separately deflected beam is proportional to the amplitude of the frequency component that produced that beam.

In order to obtain maximum optical efficiency so that the deflected light beams are at their maximum intensity, it is necessary to provide a signal to the electrical input of the AOD that is near the maximum power level at which the AOD will operate without damage. However the relationship between electrical input power and optical power of a deflected light beam is not linear when an AOD is operated at high relative power levels. When a signal is composed of multiple separate frequencies this nonlinear relationship will result in interference between one frequency and another such that the optical power of each separately deflected beam will vary as a function of the sum and difference frequencies of each separate frequency and all other frequencies in the sum signal.

This intermodulation distortion and the resulting variation in optical power of an individual beam will cause serious problems in applications where the optical power of an individual beam is required to remain constant or predictable such as optical data storage on tape or disk, optical printing and imaging, and acousto-optic signal or information processing.

One way to control the intermodulation distortion problem described above is to limit all input frequencies to exact integer multiplies of a common reference frequency, thereby limiting the sum and difference frequencies to just one frequency which is equal to the common reference frequency. This will make the intensity variation of the deflected light beams more predictable but will not reduce or eliminate such intensity variations.

What is needed in order to adequately mitigate this intermodulation problem is a means of limiting maximum signal power while at the same time maximizing average power input to an AOD. The present invention provides a means to achieve this solution by relative phase control of each frequency of the multi-frequency input signal.

In accordance with the present invention a scheme is described which allows a maximum level of electrical power to be input to an acousto-optic deflector (AOD) while at the same time minimizing the maximum power (maximum envelope power) that is input to the AOD, resulting in minimal interference between separately deflected light beams from the AOD. Such minimal interference between separately deflected light beams and their associated input signal frequencies is achieved by precise control of the frequency and relative phasing of each separate frequency relative to a common reference frequency. In accordance with the present invention, the relative phase of each separate frequency is also controlled so that a low maximum power is achieved for the combined signal that is presented to the AOD while maintaining overall average power.

The present invention may be a advantageously utilized in systems for storage and retrieval of information. Numerous prior art systems are available for the storage and retrieval of information. In each of these systems, certain objectives are clear. It is important to provide for storage and retrieval of information at high speed while maintaining the cost of the storage media and associated hardware at a low cost.

Presently, demand for data storage and retrieval capability is increasing and this increase in demand is expected to escalate in the future. There are numerous reasons for the expected increase in demand for data storage capacity, such as the need to store bit-mapped images of documents, etc. Therefore, it is desired, as one aspect of the present invention to provide more control and accuracy within storage systems which provides for more efficiency, higher speed at lower cost.

One emerging technology useful for the storage and retrieval of information is optical storage systems. Such systems allow for storage and retrieval of information on a medium through use of a light source. A well-known example of an optical storage system is an optical disk. Optical disks are utilized in a variety of functions such as recording of digitally encoded music, permanent storage of data for computer systems, etc.

Flexible optical tape, as opposed to optical disk, is commercially available in the market. Optical tape allows for storage of information on optical media with virtually limitless capacity. For Example, non-erasable write once read many (WORM) optical tape is currently available from ICI Imagedata, P.O. Box 6, Shire Park Bessemer Road, Welwyn Garden City, Herts AL7 1HD, ENGLAND. The particular tape manufactured by ICI is available in 35 mm width allowing data to be laser written in a center section at 30 megabytes per square inch (roughly the equivalent in a square inch of medium to 100 standard 5¼ inch double-sided double density floppy disks). The present invention may work with either erasable or WORM recording media. It is also understood that optical tape is commercially available from DOW Chemical Company and in addition, magneto-optic (phase change) media is available from the 3M Company and erasable dye polymer media is available from Kodak. Finally, optical storage optimally suited for use with large linear arrays is available under the tradename ETOM ™ (Electron Trapping Optical Memory) from Quantex Corporation. Such media may be described as an erasable optical storage media based on stimulated electron transitions. Each of these media may be utilized as a recording media by the present invention.

SUMMARY OF THE INVENTION

The preferred embodiment of the present may be described as an apparatus for producing a multi-frequency signal having a low maximum power while maintaining a high average power, the apparatus comprising: reference signal means; multiple oscillator means for generating a plurality of separate single frequency signals with predetermined frequency and phase relationships to the reference signal means, the multiple oscillator means commonly coupled to the reference signal means; conversion means for determining a phase combination for the plurality of separate single frequency signals, the phase combination comprising an adjusted phase relationship for each of the plurality of separate single frequency signals, the phase combination determined to minimize the maximum power while maintaining the average power of a summation signal composed of a summation of the plurality of separate single frequency signals which are adjusted by the phase combination, the phase combination also comprising amplitude data for each of the plurality of separate single frequency signals; phase and amplitude control means for independently controlling the phase relationship of each of the plurality of separate single frequency signals against the reference signal means according to the phase combination, the phase and amplitude control means also for independently controlling the amplitude of each of the plurality of separate single frequency signals according to the amplitude data and for further generating a plurality of phase and amplitude controlled separate single frequency signals, the phase and amplitude control means coupled to the multiple oscillator means and also coupled to the conversion means to receive the phase combination; and means for summing the plurality of phase and amplitude controlled separate single frequency signals to produce the multi-frequency signal having low maximum power while maintaining a high average power, the means for summing coupled to the phase and amplitude control means.

An apparatus as described above further comprising an acousto-optic deflector means for producing multiple output deflected light beams from an input light source, each of the multiple output deflected light beams corresponding to each of the plurality of phase and amplitude controlled separate single frequency signals, the acousto-optic deflector coupled to the means for summation to receive the multi-frequency signal.

The apparatus as described above wherein: the multiple oscillator means are multiple independent phase locked loop frequency synthesizers; the conversion means is a data conversion circuit for converting binary logic signals to phase and amplitude control signals so as to maintain a minimum relationship between maximum power and average power in the multi-frequency signal for any combination of logic states for the binary logic signals; the phase and amplitude control means comprises a plurality of double balanced mixer circuits to adjust the phase relationships and amplitudes of the plurality of separate single frequency signals; the means for summing further comprising an amplifier circuit for increasing the relative power level of the multi-frequency signal; the reference signal means is a master clock signal; and the acousto-optic deflector means is a Bragg Cell having a piezoelectric contact.

BRIEF DESCRIPTION OF THE DRAWINGS

FIGS. 3(A), 3(B), and 3(C) are plots of time versus total amplitude for each of the three equally spaced frequencies which were summed in the plot of FIG. 3(D).

FIG. 3(D) is a plot of time versus total amplitude for a sum of three equally spaced frequencies with all three frequency in phase at the beginning of the plot.

FIGS. 4(A), 4(B), and 4(C) are plots of time versus total amplitude for each of the three equally spaced frequencies which were summed in the plot of FIG. 4(D).

FIG. 4(D) is a plot of time versus total amplitude, for the present invention, for a sum of three equally spaced frequencies with the relative phase of the third (highest) frequency shifted by 180 degrees.

DETAILED DESCRIPTION OF THE PREFERRED EMBODIMENT

The present invention includes a specially designed circuit to independently control the frequency, phase and amplitude of each frequency signal input by summation means to an acousto-optic deflector in order to reduce maximum power of the sum signal while maintaining high average power throughout the signal cycle. In the following description numerous specific details are set forth in order to provide a thorough understanding of the present invention. However, it will be obvious to one skilled in the art that the present invention may be practiced without these specific details. In other instances well known circuits, structures and techniques have not been shown in detail in order not to unnecessarily obscure the present invention.

While the invention is described in some detail herein with specific reference to a certain embodiment, it is to be understood that there is not intent to limit it to that embodiment. On the contrary, the aim is to cover all modifications, alternatives and equivalents falling within the spirit and scope of the invention as defined by the appended claims.

Figure 1A:
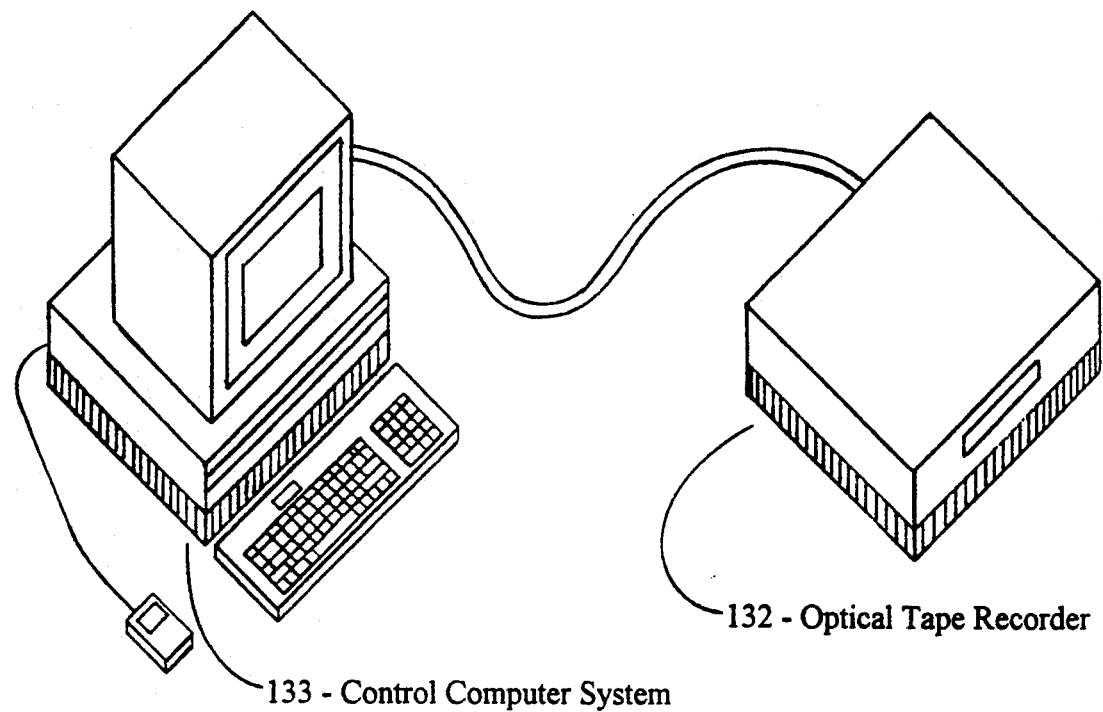
FIG. 1(A) illustrates an optical tape recorder (OTR) which is one environment in which the present invention may operate.

(1) Illustrated System Environment of the Preferred Embodiment of the Present Invention The present invention may be embodied in an optical tape recording/reading apparatus as is shown generally in FIG. 1(A). The optical recording/reading tape recorder 132 is communicatively coupled to a computer 133 for use as a data storage and retrieval device for the computer 133. However, it should be noted that the present invention can be advantageously utilized in a number of various embodiments and systems capable of utilizing the frequency, amplitude and phase control properties of the present invention. The optical tape recording/reading apparatus was used to help clarify the properties of the present invention by example and by providing operating environment. It should be appreciated that the optical recording/reading apparatus should not be construed as limiting the scope, application, or usefulness of the present invention.

Figure 1C:
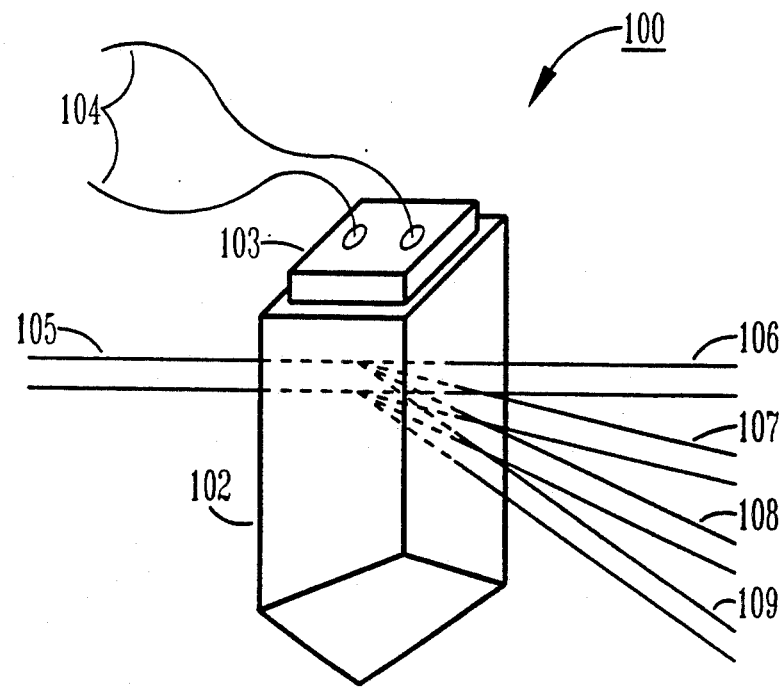
FIG. 1(C) is illustration of an AOD with one input beam and several output beams.
Figure 1B:
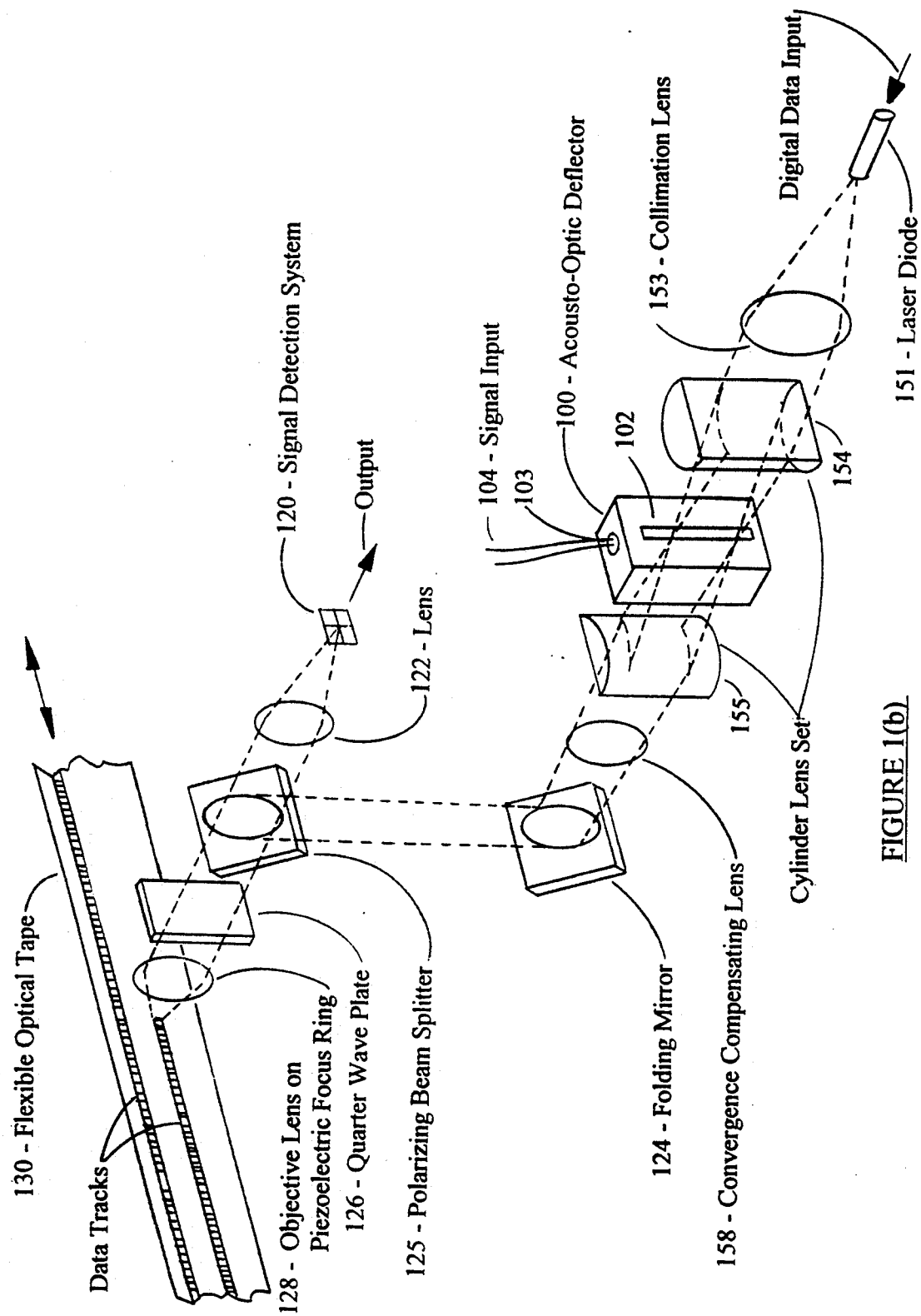
FIG. 1(B) illustrates in more detail system mechanisms of an optical tape storage system which is one environment in which the present invention is advantageous.

The present invention may be embodied in an optical tape recording/reading apparatus as is shown in detail in FIG. 1(B). The optical tape system used with the present invention allows recording and retrieval of digital data using solid-state optical beam deflection techniques. As illustrated with reference to FIG. 1(B), the system of the preferred embodiment comprises a radiant energy source 151 positioned to project a radiant energy beam through a collimating lens 153, a beam correcting assembly 155 into an acousto-optic deflector or Bragg cell 100. A beam is projected from the Bragg cell 100 through lens 155, through convergence compensating lens 158 and from folding mirror 124 to a polarizing beam splitter/mirror assembly 125, then through a lens assembly comprising a quarter-wave plate 126 and an objective lens 128 onto a recording medium such as tape 130.

As will be apparent to one of ordinary skill in the art, an optically sensitive recording medium may be written onto using the above-described components of FIG. 1(B). These components will be described in more detail below to better enable the skilled artisan to practice the environment of the invention.

Laser Diode 151

The laser 151 preferably comprises a solid state diode laser operating near 830 nm. It is, of course, obvious that alternative radiant energy sources may be utilized. What is important is that the radiant energy source produce sufficient energy to allow exposure of the recording medium and that the energy source may be controlled to allow presentation of digital information for recording on the recording medium.

Collimating Lens 153

The energy beam produced by the laser 151 is preferably collimated by a collimating lens assembly 153 to form a beam matching the input requirements of the beam matching assembly 155.

Beam Matching Assembly 155

Referring to FIG. 1(B), beam matching means are provided to nominally collimate the output of the acousto-optic deflector 100. Preferably, a first cylindrical lens 154 is provided for beam matching positioned in the beam path between the collimating lens 153 and the acousto-optic deflector 100. The parameters of the beam matching optics are selected to match the size of the optical beam with the size of the acoustic beam passing through acousto-optic deflector 100.

In addition, a second cylindrical lens 155 is provided, positioned in the beams path between the Bragg cell and beam splitter/mirror assembly 125. Preferably a convergence compensating lens 158 is also provided in the path of the beams between the second cylindrical lens 155 and the beam splitter mirror assembly 125.

Acousto-Optic Deflector 100

As illustrated by FIG. 1(B), the material 100 comprises an acousto-optic deflector (AOD) also called a Bragg cell. The AOD 100 is positioned to receive the energy beam from the cylindrical lens 154 and produces an output beam directed to cylindrical lens 155. The AOD is further coupled to receive a scan input signal from input lines 104.

The AOD is shown in more detail with reference to FIG. 1(C). In the preferred implementation, a tellerium dioxide crystal 102 is utilized in which propagates a longitudinal mode acoustic wave. Although the preferred implementation utilizes an AOD comprising the tellerium dioxide crystal 102, any device having similar characteristics may be utilized.

The signal is converted to acoustic energy by means of a piezoelectric transducer 103 which is bonded to the crystal 102 and tuned to a frequency band of interest. The transducer 103 of the preferred embodiment comprises a lithium niobate wafer; however other materials can be used. For example, zinc oxide may be deposited on crystal 102 to form the transducer 103. Many piezoelectric materials may be effectively used.

Acousto-optic deflectors may comprise glass, crystal or even a liquid as the crystal 102; however, it has been discovered that natural crystals in general and tellerium dioxide in particular yield efficiencies over other types of cells when with the present invention.

More information on the environment of the preferred embodiment of the present invention can be found though the following related copending application, Ser. No. 07/796,461, filed on Nov. 11, 1991, entitled Multifrequency Parallel Read-Write Optical Tape Recording System and assigned to the assignee of the present invention which is incorporated herein by reference.

(2) Detailed Description of the Preferred Embodiment of the Present Invention

The present invention relates to an apparatus and method for reducing the intermodulation between separate frequencies supplied to an acousto-optic deflector in multi-frequency mode by independently controlling the frequency, phase and amplitude of these separate signals that are summed to create the input signal to the acousto-optic deflector 100. The present invention reduces the maximum power envelope of the summed signal while maintaining average power.

The specific details of the preferred embodiment of the present invention will now be described. Turning now to the FIG. 1(C) of the drawings there is an acousto-optic deflector (AOD) 100 having an acousto-optic medium 102 to which is attached an electro-mechanical transducer 103 with attached wires 104. Wires 104 carry the summed multi-frequency signal which is used as input to the AOD 100. The acousto-optic deflector 100 used in the preferred embodiment is a commercially available Bragg cell; however, it is appreciated that any acousto-optic medium of similar characteristics may equally be used in the present invention. The electro-mechanical transducer 103 used in the preferred embodiment is a piezoelectric material. When a time varying signal, such as a radio frequency signal, is applied by wires 104 to the electro-mechanical transducer 103, mechanical waves are set up within the acousto-optic medium 102; these waves within the Bragg cell will effect a light beam passing there through. In FIG. 1(C), three separate signal frequencies are summed to create the resultant input signal at 104.

Entering one side of the acousto-optic medium 102 is an incident light beam 105 which passes through the acousto-optic medium 102 and exits in multiple beams 106 through 109 or more. The incident light beam 105 of use in the present invention is a laser beam, however any coherent or directional light beam of similar character may be employed with the present invention.

The signal supplied by wires 104, and therefore applied to the Bragg Cell, may consist of a single frequency or a multiple frequency signal. The multiple frequency signal related to the present invention is the mathematical summation of a number of single frequency signals each having a separate frequency. It is noted that if the frequency difference for each of these separate but summed signals is D Hz then the multi-frequency signal of importance in the present invention will have a beat frequency of 1/D Hz.

Refer to FIG. 1(C). A multiplicity of these beams 107 through 109 (or more) are deflected by the interaction of the original light beam 105 and the acoustic wave generated in the medium 102 from the multi-frequency signal at 104. The other beam 106 is comprised of the portion of incident beam 105 which did not interact with the acoustic wave and therefore passed there through unchanged. The particular angles of the deflected light beams 107 through 109 (or more) relative to the axis of the medium 102 are each proportional to the individual frequency of each of a multiple of single frequency signals which are summed and presented to the electrical input wires 104 of the transducer 103. Because there were three separate signal frequencies summed together at the input from wires 104 there are three separate deflected light beams 107 to 109 in this example.

Transducer 103, of FIG. 1(C), performs an electro-mechanical translation ("vibrations") of the electrical signal supplied through wires 104 thereby creating an acoustic (mechanical) wave which propagates into medium 102 and interacts with incident light beam 105 resulting in deflected light beams 107 through 109 (or more). Light beams 107 through 109 correspond to three separate frequency inputs to wires 104, however there may be fewer or many more individual frequencies summed and presented to wires 104 resulting in correspondingly fewer or many more deflected light beams than those illustrated as 107 through 109. For example, if the signal present at wires 104 was the summation of eight separate time varying electrical signals then nine light beams would radiate from the Bragg cell 100, one from the incident beam that passes unchanged 100, and eight from the separate frequencies which were summed.

Figure 2:
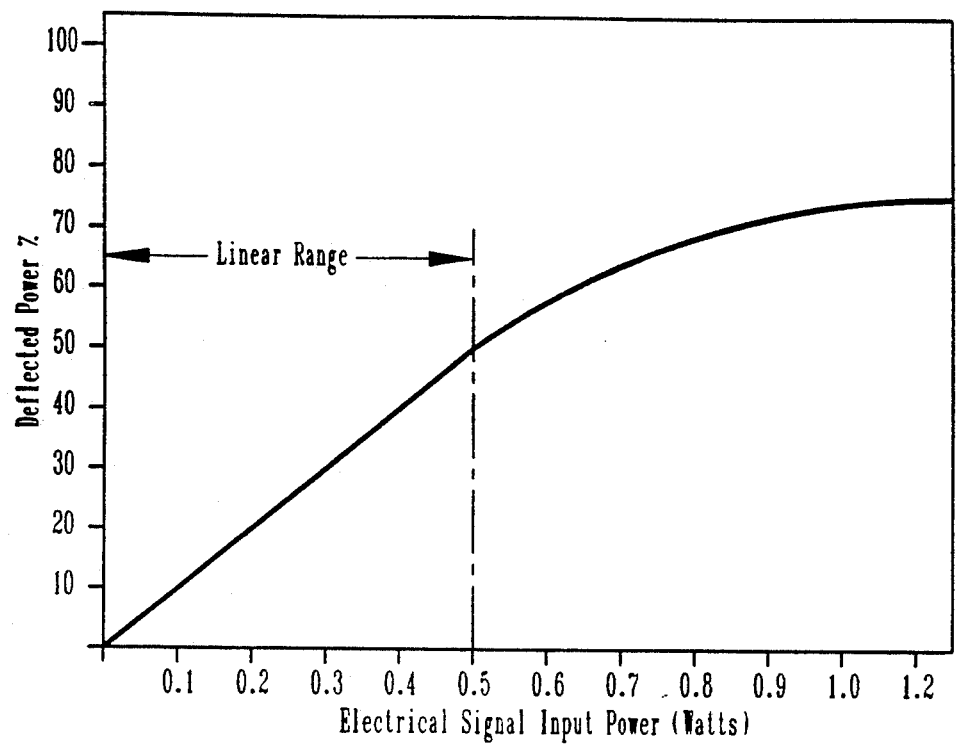
FIG. 2 is a power transfer curve illustrating electrical power input to deflected optical beam percentage power output of a typical AOD.

FIG. 2 illustrates the relationship of electrical signal input power (horizontal axis) from wires 104 to percentage of optical power deflected (vertical axis) in a typical AOD such as the Bragg cell 100; this curve is also called a power transfer curve for the AOD. As the electrical signal input is increased in the lower range of powers (from 0.1 to 0.5 watts in the illustrated case along the horizontal axis) the relationship between signal input power and percentage of optical power deflected by the AOD 100 is quite linear as shown by the straight line of the graph over these signal input power values.

However, as the signal input power is increased the relative efficiency of the AOD 100 decreases and less additional light is deflected for an equal signal power increase which results in a departure from a linear relationship into a curved or logarithmic response. This nonlinear region of the input power is shown within the range of just over 0.5 to 1.2 watts along the horizontal. As signal input power is increased still further (beyond 1.0 watts in the illustrated case) the amount of additional light deflected decreases even more until there is no additional light deflected at some power level (a level above 1.2 watts in the illustrated case). Therefore, it is clear that what is desired is to remain within the linear portion of the transfer curve thus avoiding the nonlinear portion of the graph that will cause distortion, as discussed immediately below.

Refer to FIG. 2. As stated above, the signal of the present invention is a multi-frequency input signal at wires 104. It is well known that a curved or nonlinear power transfer relationship causes a signal composed of a sum of separate frequencies to distort in a manner creating additional frequencies which correspond to the sum and difference frequencies of each of the separate input frequencies against all other separate input frequencies. In other words, the signal distortion is relative to the frequency sum and difference of each of the separate frequencies which were summed. This distortion is commonly referred to a process of intermodulation distortion.

As an additional part of this nonlinear process or distortion, the intensity of each of the deflected light beams 107 through 109 (or more) will vary at a rate or rates corresponding to the sum and difference frequencies of each of the separate input frequencies against all other separate input frequencies. This intensity modulation of the deflected light beams 107 through 109 is a serious problem in any application or process where an AOD 100 may be used and which also depends upon a constant or predictable intensity for each of a multiple of deflected beams as 107 through 109. With respect to the optical tape storage system, distortion in the intensity of the light beams will effect the accuracy of the data storage and retrieval functions of the systems.

The present invention solves the above distortion problem by constraining the multi-frequency signal applied to the AOD 100 to remain within the linear portion of the transfer curve of FIG. 2. The present invention operates by precisely synchronizing each separate input frequency in time, via frequency and phase adjustment, relative to a common reference frequency to create a sum signal of all the separate input frequencies that has a relatively high average power but a greatly reduced maximum power. If for a given average power of the multi-frequency signal the maximum power is limited then the AOD 100 will operate on a lower and more linear portion of the power transfer curve thereby greatly reducing intermodulation distortion and resulting deflected light beam intensity variation. The end result when the preferred embodiment of the present invention is applied to the optical tape recording system is vastly improved data storage and retrieval efficiency and accuracy.

The following discussion illustrates in detail the characteristics of multi-frequency signals (the summed signal) including the occurrences of their maximum power excursions. The discussion also shows how phase adjustment of the separate input signals can be effectively utilized to limit the maximum power excursions of the summed signal while maintaining relatively high average power over the multi-frequency input which would be applied to the AOD 100.

FIG. 3(D) illustrates a simple example of only three signals summed. This figure shows a signal 350 that is composed of a sum of three separate frequencies each of unity amplitude with the phase of each frequency adjusted so that all signals are in phase (cross the zero axis at zero amplitude and in the same direction) at the start of the graph. The horizontal axis represents time and the vertical represents voltage level output of the signal. The resulting maximum amplitude is 3 units as expected from a simple sum of three signals of unity amplitude.

FIGS. 3(A), 3(B) and 3(C) illustrate in more detail the three separate single frequency signals 310, 330, 340, respectively, which are summed to create signal 350 (of FIG. 3(D)). Each signal has unity amplitude and the same initial phase but a different frequency is associated with each signal. It can be seen from FIG. 3(C) that signal 340 has a more rapid frequency than signal 330 which is more rapid still then signal 310.

However, if the relative phase of one of the three frequencies (310, 330, 340) is adjusted by 180 degrees (or pi radians) the graph of FIG. 4(D) is obtained wherein the average power in the summed signal 450 has remained the same but the maximum amplitude has decreased to a value of 2.2 units corresponding to an amplitude reduction of 26.6% ((3.0−2.2)/3.0)×100) and a maximum power reduction of 46.2%. As shown comparing signal 450 to signal 350, the maximum power amplitude of FIG. 4(A) has been greatly reduced while maintaining average power.

FIGS. 4(A), 4(B), and 4(C) illustrate the separate single frequency signals 410, 430, 440, respectively, summed to create signal 450. Signals 410 and 430 are equivalent respectively to signals 310 and signals 330 and are therefore in phase. However, signal 440 is adjusted by 180 degrees phase to that of signal 340; signal 440 is, in effect, inverted. This resultant phase adjustment causes the decrease in maximum amplitude of signal 450 over that of signal 350. The process of phase shifting input frequency signals can be applied to any number of frequencies and there are many phase combinations which will result in substantial reductions in maximum power for a given average power.

Figure 5:
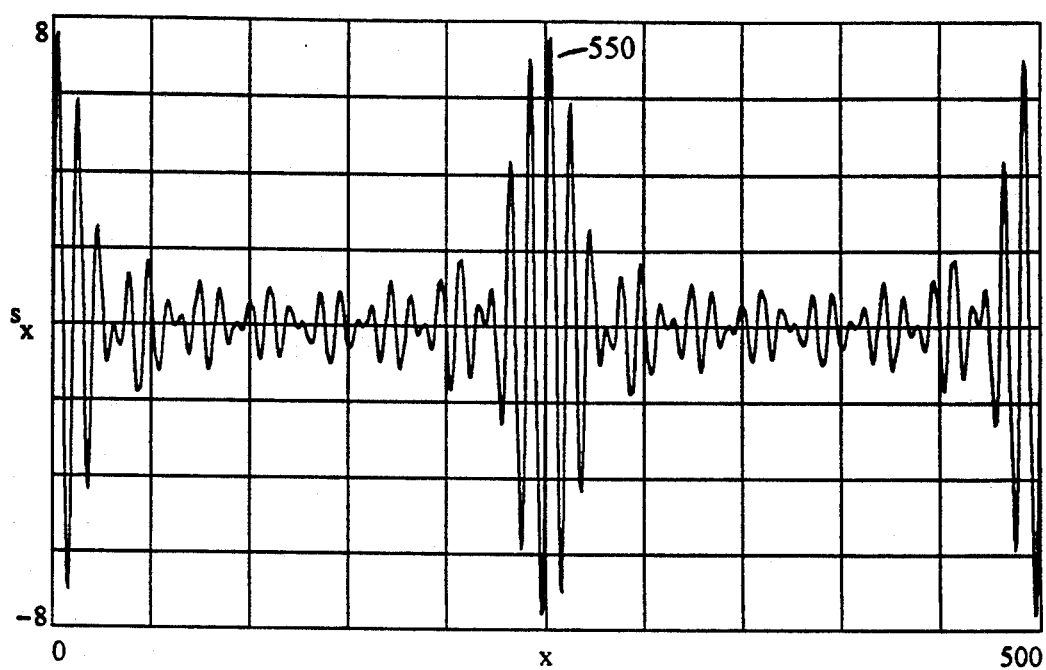
FIG. 5 is a plot of time versus total amplitude for a sum of eight equally spaced frequencies with all eight frequencies in phase at the beginning of the picture.

FIG. 5 illustrates the more practical example of the result when more input signals are summed together. The graph of signal 550 shows the result of the sum of eight unity amplitude equally spaced (by frequency) frequencies when each of the eight frequencies is in phase at the start of the graph. Note that the maximum amplitude of signal 550 is very nearly eight units (the small error in the graph is due to truncation/sampling errors in the computer model used). A large amount of the power of this signal is associated with the portion nearest to the maximum amplitude.

The present invention acts to adjust the phases of some of these eight signals to reduce the maximum power amplitude of the summation signal while maintaining high average power. One embodiment of the present invention utilizes a computer program (described in detail later) to calculate by numerical methods the phase adjustments for each separate input frequency in order to minimize the maximum amplitude of the summation signal. After determining the desired degree of phase resolution, the computer program calculates each possible combination of signal phase for each signal to arrive at the best phase arrangement that reduces maximum amplitude for the summation signal. It can be appreciated that any number of different methods and algorithms can be effectively utilized to arrive at this result. For example, FIG. 6 illustrates the summation signal 650 obtained for eight unity amplitude equally spaced frequencies where the relative phases of the frequencies have been adjusted by the present invention and are as illustrated in Table 1.

TABLE 1

| Separate Signal Frequency Signal | Signal Phase |
|---|---|
| 1 (lowest frequency) | 0 degrees (0 radians) |
| 2 (next higher frequency) | 0 degrees |
| 3 | 135 degrees (2.3562 radians) |
| 4 | 146.25 degrees (2.5525 radians) |
| 5 | 270 degrees (4.7124 radians) |
| 6 | 123.75 degrees (2.1598 radians) |
| 7 | 213.75 degrees (3.7306 radians) |
| 8 (highest) | 90 degrees (1.5708 radians) |

Figure 6:
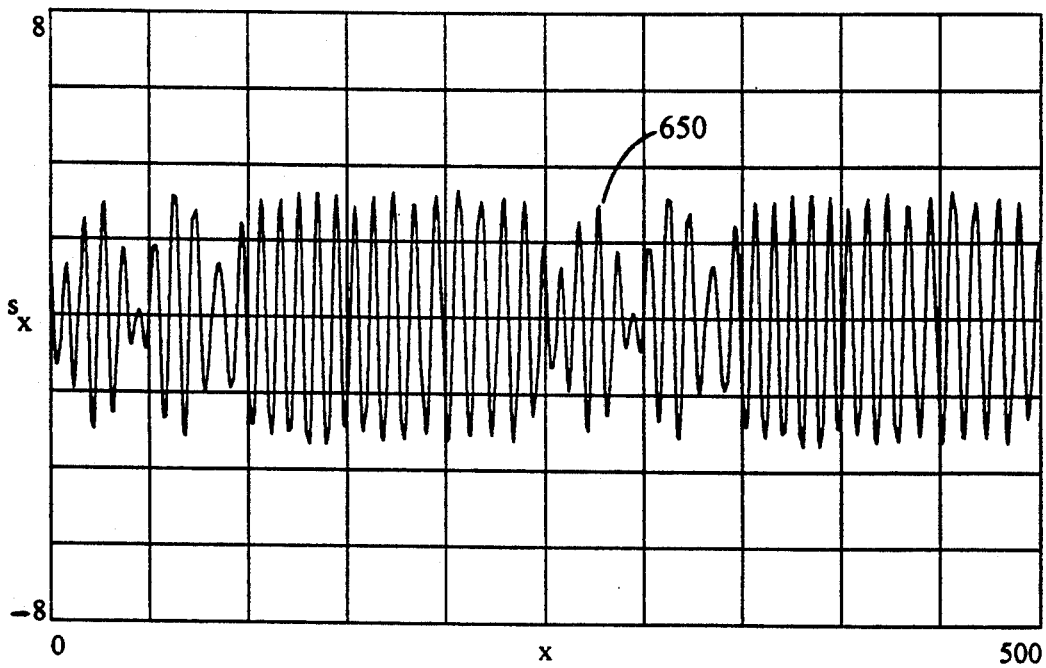
FIG. 6 is a plot of time versus total amplitude, for the present invention, for a sum of eight equally spaced frequencies with the relative phases of each of the eight frequencies adjusted so that the sum signal has minimum peak envelope power.

As can be seen in FIG. 6 the particular phasing arrangement described above in Table 1 results in a maximum amplitude of about 3.34 units which is a 58.2% lower maximum amplitude and a 82.6% lower maximum power than that of signal 550 of FIG. 5. However, both graphs have the same average power.

In order to simplify the electronic circuits used to generate multiple frequencies composed of integer multiples of a reference frequency and to adjust the phase of each of these frequencies it may be necessary to limit the phase adjustment capability (degree resolution) of the circuits to a small number of discrete phase relationships. Reducing the allowable phase adjustment capability also reduces the processing complexity of the apparatus used to compute the phase relationships yielding the minimum peak power of the summation signal; one such apparatus is a computer program operating with a computer system.

Figure 7:
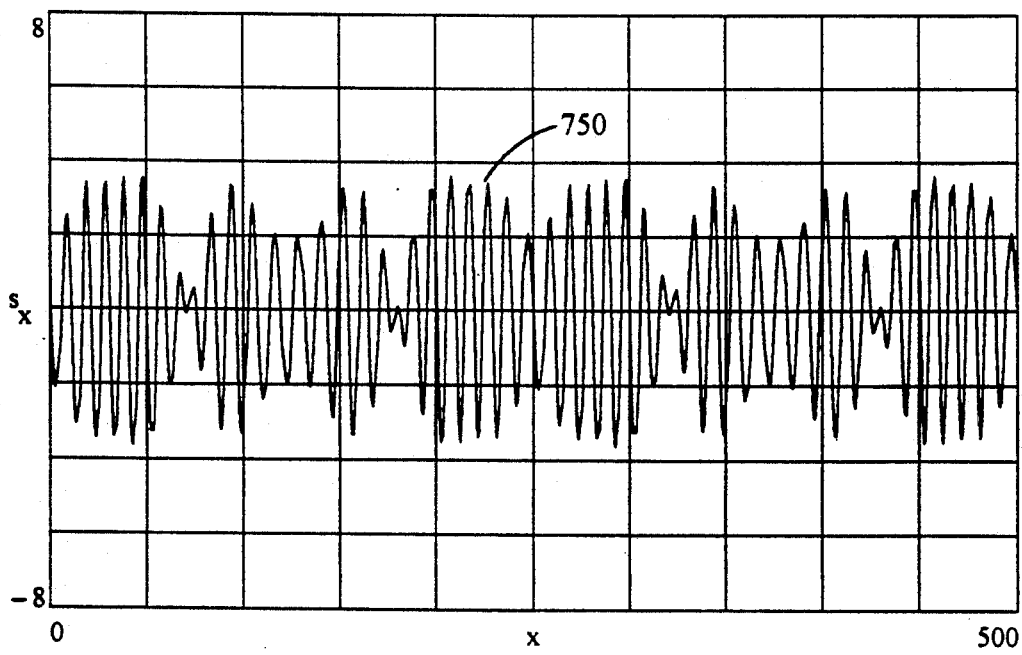
FIG. 7 is a plot of time versus total amplitude, for the present invention, for a sum of eight equally spaced frequencies with the relative phases of each of the eight frequencies adjusted so that the sum signal has minimum peak envelope power and with the additional constraint that the phase of each frequency is only adjustable by 0 or 180 degrees.

One such simplification utilized by the preferred embodiment of the present invention is to limit the phase relationships to only two values, either 0 or 180 degrees (O or Pi radians). That is to say, the phase of each input signal can be adjusted only by 180 degrees which effectively inverts the original signal. Therefore, each input signal is either inverted or not, depending on the processing result of the computer program designed to calculated the phase relationships or "phase combinations." The values of Table 2 illustrate the results of the computer program limited by these two phase adjustments for the eight separate signals used above. As illustrated by the graph FIG. 7, substantial reductions in maximum power can still be achieved within this limitation. FIG. 7 illustrates the signal 750 obtained for eight unity amplitude equally spaced frequencies where the relative phases of the frequencies are as shown by Table 2. Comparing the graphs of FIG. 5 and FIG. 7 it can be seen that reducing the degree resolution to 0 and 180 degrees still makes a profound effect on reducing the maximum amplitude of the summation signal.

TABLE 2

| Signal Frequency Number | Signal Phase |
|---|---|
| 1 (lowest frequency) | 180 degrees (Pi radians) |
| 2 (next higher frequency) | 0 degrees |
| 3 | 180 degrees (Pi radians) |
| 4 | 180 degrees (Pi radians) |
| 5 | 180 degrees (Pi radians) |
| 6 | 180 degrees (Pi radians) |
| 7 | 0 degrees |
| 8 (highest) | 0 degrees |

In analyzing the results it can be seen that the maximum power achieved with the above arrangement of phases is about 3.61 units corresponding to a reduction of 54.9% in maximum amplitude and a 79.6% reduction in maximum power.

The preferred embodiment of the present invention may operate advantageously within an environment of an optical storage system as discussed above. One embodiment of this storage system utilizes a multi-frequency signal having eight separate input frequencies which are summed to create the summation signals at wire input 104. Each signal has a unique frequency which corresponds to a data location on the optical medium (tape) which in turn is associated with a data bit. The data bits are written in parallel, eight bits at a time. Hence, each of the 8 beams which exit the AOD 100 corresponds to a bit of data. For the recording stage, a separate input frequency is either present, yielding a "1" (i.e., the beam was present) or not present yielding a "0" (i.e., the beam was not present) recorded on the tape.

Since there are eight signals there are $2^8$ or 256 different arrangements of signal combinations. The first combination being all eight signals not present which yields a data pattern of "00000000" and the last combination being all signals present yielding data of "11111111" on the tape. When all signals are on and there is no phase adjustment we arrive at the summation signal represented by FIG. 5. With discrete phase adjustment capability we arrive at the summation signal of FIG. 7.

The computer program utilized in the present invention to determine the optimum phase combination yielding the lowest maximum power of the summation signal is designed to process each of the 256 different combinations of input signals and for each arrive at the best phase adjustment or relationships to reduce maximum amplitude output of the summation signal. For each signal present, i.e., "1" data bit, the computer program outputs either a positive phase value or a negative phase value. Positive or "0" means the wave will not be phase adjusted and negative or "1" means that the wave will be inverted, i.e., phase adjusted by 180 degrees. A result of "#" means we don't care since either the signal is not on or there are only one or two signals on and therefore no reduction in maximum power is possible. Phase adjustment is only effective when there are three or more signals present since with just one or just two signals present at a time any phase adjustments will not change the maximum power of the waveform.

Table 3 illustrates the results of a sample of 54 of the 256 combinations of the signal data. The data of this table was generated by the computer program which is described in more detail in FIG. 11 and the discussion thereof. The Data Combination column represents the signal pattern of the separate single frequency signals while the Phase Combination column represents the optimum phase combination of the separate signals that creates the minimum peak power for a summation of the separate signals.

For Example, the data "01101111" means that six of the eight input signals are on. The first, second, third, fourth, six and seventh are on and the fifth and sixth are off (reading right to left). The result of the computer processing is "#10#1000" which tells that we don't care about the phase of the signals that are off; the first three signals and the sixth signal are not inverted while the fourth and seventh signals are inverted, i.e., phase adjusted by 180 degrees. As discussed with reference to FIG. 7, the data stream is "11111111" since all signals are on and the computer result is "00111101." So the first, third, fourth, fifth, and sixth signals are inverted while the others are not.

TABLE 3

| Data Combination | Phase Combination | Data Combination | Phase Combination |
|---|---|---|---|
| 01100111 | #00##010 | 10000101 | 1####0#1 |
| 01101000 | #01#0### | 10000110 | 1####00# |
| 01101001 | #01#0##1 | 10000111 | 0####100 |
| 01101010 | #01#1#0# | 10001000 | ######## |
| 01101011 | #00#0#01 | 10001001 | 1###0##0 |
| 01101100 | #10#00## | 10001010 | 1###0#0# |
| 01101101 | #11#01#1 | 10001011 | 0###1#10 |
| 01101110 | #01#000# | 10001100 | 1###01## |
| 01101111 | #10#1000 | 10001101 | 0###10#0 |
| 01110000 | #001#### | 10001110 | 0###100# |
| 01110001 | #011##0 | 10001111 | 0###0010 |
| 01110010 | #011##00 | 10010000 | ######## |
| 01110011 | #111##01 | 10010001 | 1##0###1 |
| 01110100 | #011#1## | 10010010 | 1##1##0# |
| 01110101 | #011#0#0 | 10010011 | 1##1##01 |
| 01110110 | #101#00# | 10010100 | 0##0#1## |
| 01110111 | #111#010 | 10010101 | 0##1#0#0 |
| 01111000 | #1000### | 10010110 | 1##0#10# |
| 01111001 | #1101##0 | 10010111 | 0##0#011 |
| 01111010 | #0010000 | 10011000 | 0##01### |
| 01111011 | #0100#11 | 10011001 | 0##11##1 |
| 01111100 | #10111## | 10011010 | 1##00#0# |
| 01111101 | #11101#0 | 10011011 | 1##01#11 |
| 01111110 | #110100# | 10011100 | 0##011## |
| 01111111 | #0100111 | | |
| 10000000 | ######## | | |
| 10000001 | ######## | | |
| 10000010 | ######## | | |
| 10000011 | 1#####00 | | |
| 10000100 | ######## | | |

| | | | |
|---|---|---|---|
| 1 = Signal On | 1 = 180 degree | 1 = Signal On | 1 = 180 degree |
| 0 = Signal Off | 0 = degree | 0 = Signal Off | 0 = degree |
| | # = don't care | | # = don't care |

The results of Table 3 for all of the combinations are placed into a computer memory where they can easily be accessed within the system of the present invention. This will be discussed in more detail further below.

Figure 10:
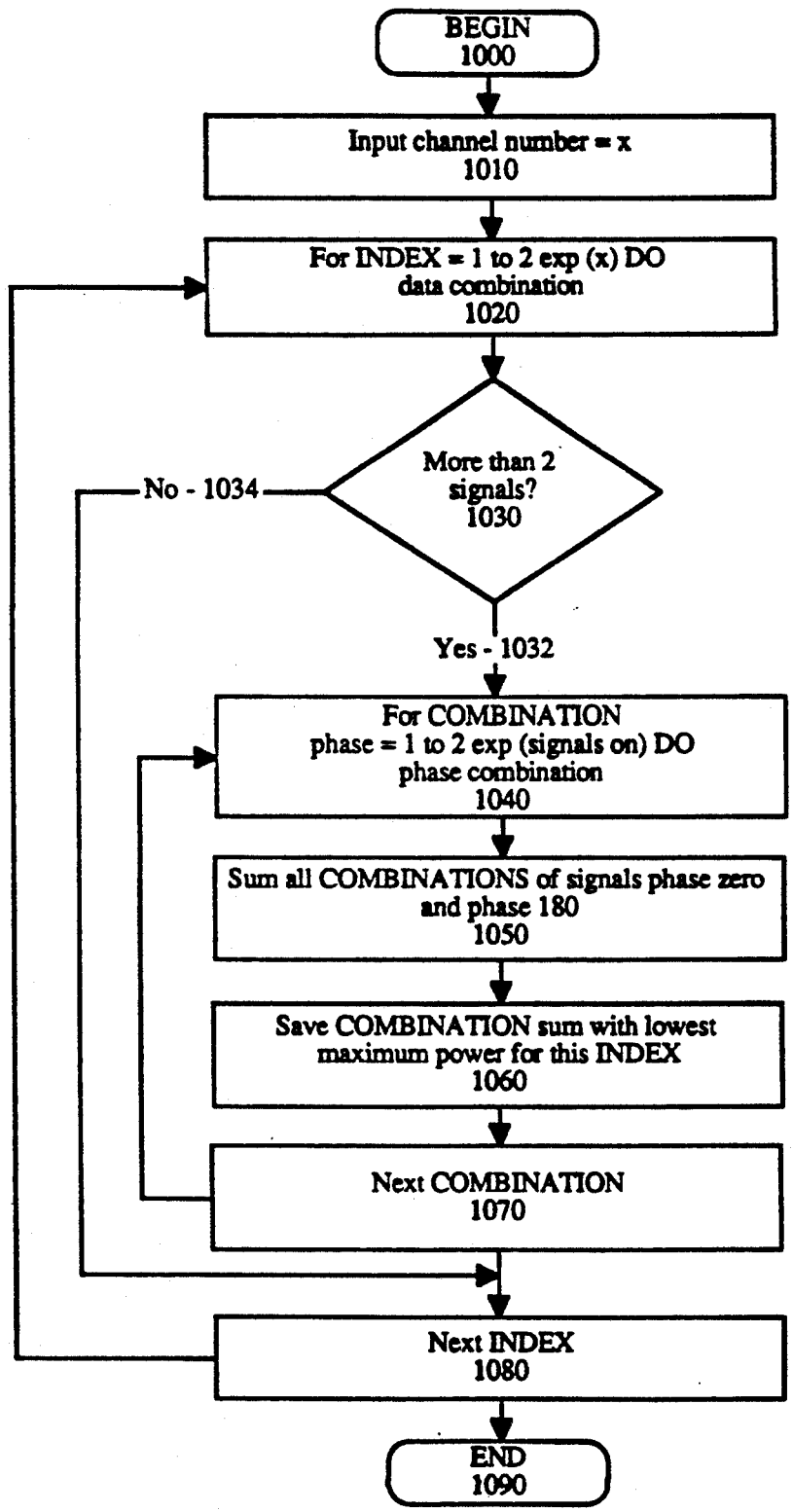
FIG. 10 is a flow chart of the basic processing flow for the computer software used to generate the phase combination data for the preferred embodiment of the present invention.

FIG. 10 illustrates the basic flow diagram of the computer program utilized in the preferred embodiment of the present invention. The program starts in state 1000 and proceeds to input the number of channels ("x") or "data bits" that will be used in the system; this occurs in state 1010. In our above example the value of x was eight since we had eight channels or "frequency signals." Since there must be a separate phase adjustment for each combination the program must cycle through and generate a phase relationship (phase combination) result for each data combination. At stage 1020 the computer calculates the total number of data combinations as being $2^x$, and assigns these many index cycles in order to process each data combination. In our example $2^{(x=8)}=256$ data combinations, so there must be 256 cycles performed.

Refer to FIG. 10. The computer proceeds to state 1030 which checks if there are at least three signals on in the present data combination. If there are not, the computer proceeds to state 1080 where the next data combination or "index" is retrieved. If there are three or more signals present in this data combination the computer proceeds to state 1040 where the total number of phase combinations for this data combination are generated. The number of phase combinations is found by $2^{(number\ of\ signals\ on)}$. At state 1030 the signals which are not on receive don't care identifiers ("#") for their phase data. Data combinations have two or fewer signals on receive all "don't care" identifiers for their phase combination.

For Example, if three signals are on then there are the following eight ($2^3$) phase combinations of phase adjustments to consider: "+++"; "++−"; "+−+"; "+−−"; "−++"; "−+−"; "−−+"; and "−−−" (where "−" is an inverted signal and "+" is a non inverted signal). Each phase combination or just "combination" is checked by a means of trial and error to determine the combination yielding the lowest maximum amplitude of the summation signal. At state 1050 the on signals for each separate phase combination are summed to create a multi-frequency or summation signal and this summation signal cycle is studied to determine the maximum power amplitude point for the summed signal. If the current phase combination yields a lower maximum power amplitude than the previous phase combination for any given data combination, that phase combination is saved by state 1060. If the current phase combination yields a larger maximum amplitude value than the previous phase combination, it is ignored by state 1060.

The computer next proceeds to state 1070 where the next phase combination is processed for a given data combination until each separate phase combination has been checked. When each phase combination is complete for any given data combination, state 1060 will have saved the phase combination yielding the lowest maximum power amplitude of the summation signal for that data combination.

The computer next proceeds to state 1080 to retrieve the next data combination and the entire process will repeat until the last data combination or "11111111" has been processed. Then the computer returns to state 1090 which ends the computer program. The results of the computer program executed for 8 channels are shown by Table 3. The data combinations and the phase combinations are stored in computer memory and accessed during the operation of the preferred embodiment of the present invention to direct the phase control of each of the separate input frequencies which are summed. In the preferred embodiment of the present invention the results are stored in EPROMs 1210 and 1212. The result being a summed signal applied at 104 which has a reduced maximum power while maintaining high average power.

Next, the following discussion illustrates and describes in more detail the circuitry and apparatus used to implement the preferred embodiment of the present invention.

Figure 8:
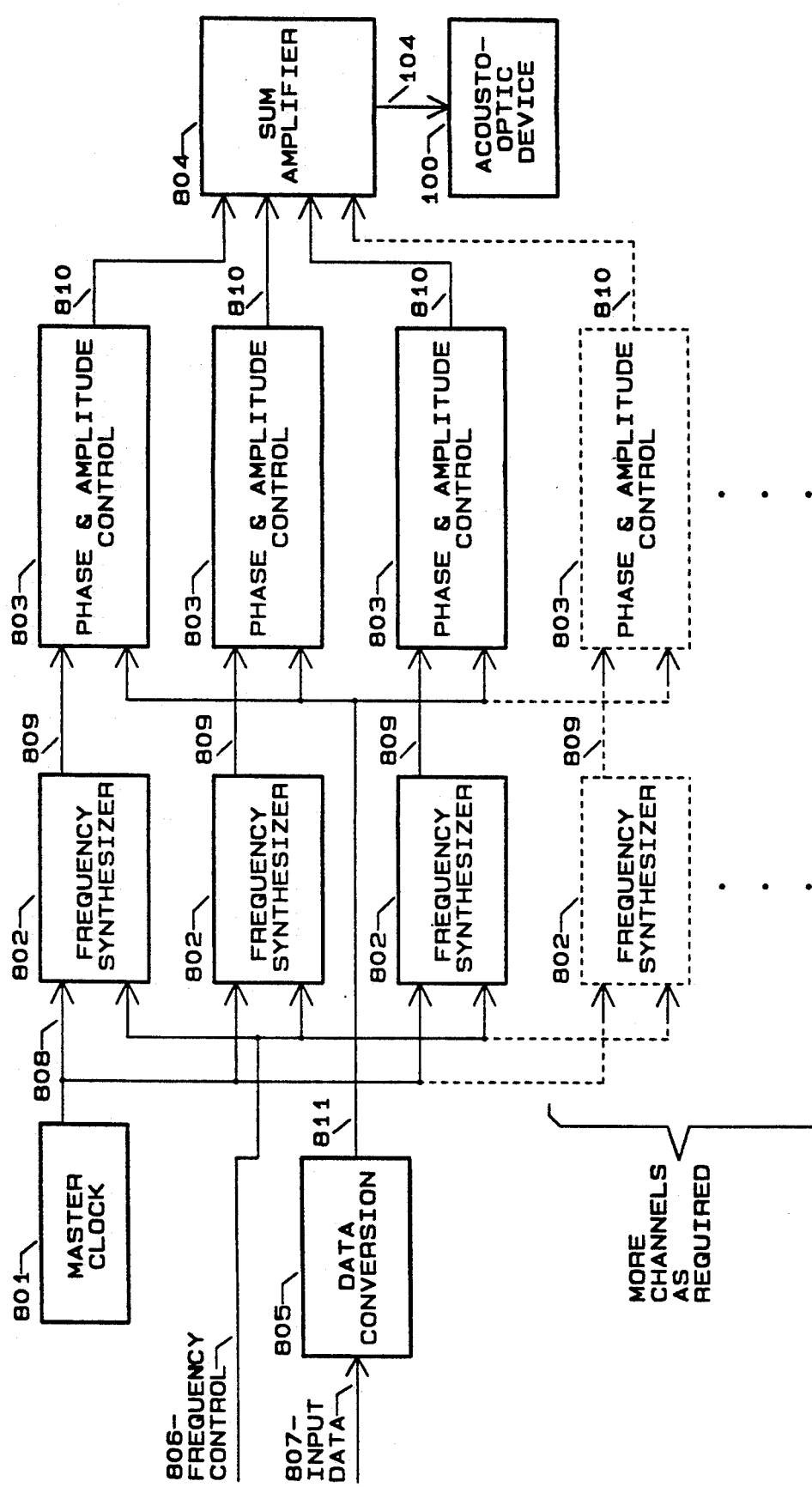
FIG. 8 is an overall block diagram of one embodiment of the present invention illustrating a bank of synthesizers used to generate a phase and amplitude controlled sum of multiple frequencies.

FIG. 8 illustrates the preferred embodiment of the present invention in block diagram form. Generally, as can be seen from FIG. 8 several channels are present; one channel for each single frequency signal. A plurality of separate single frequency signals is produced by these channels. Each of the channels is composed of a Frequency Synthesizer 802 and a Phase and Amplitude Control unit 803. Each channel outputs a separate frequency signal 810 which will be summed by the Sum Amplifier 804 to produce the summation or multi-frequency signal at 104.

In the preferred embodiment of the present invention there are eight channels and therefore eight separate single frequency signals summed by the Sum Amplifier 804. The first seven channels are identified as Channel A through Channel G. Terminology utilizing "A" through "G" therefore refers to the channel identity.

Specifically, Master Clock 801 provides a frequency and phase reference source for Frequency Synthesizers 802. There may be as few as three or as many as fifty or more frequency synthesizers in the circuit depending upon how many individual frequencies are required in the system. Each Frequency Synthesizer 802 creates one single frequency signal for a channel. In the preferred embodiment of the present invention there are eight channels utilized, therefore there are eight Frequency Synthesizer 802 and Phase and Amplitude Control 803 blocks.

Frequency Synthesizers 802 provide a radio frequency (RF) signal 809 to Phase and Amplitude Control circuits 803 which in turn select the desired output phase and amplitude of each individual frequency in the system. Sum Amplifier 804 sums all the eight single frequency outputs 810 in the system together and provides any necessary filtering and amplification for the signals. The Sum Amplifier 804 creates the multi-frequency or summation signal via output 104. The Sum Amplifier 804 output connects to input wires 104 of the AOD 100 to provide the AOD with a phase and amplitude controlled sum of all desired individual frequencies.

Data Conversion circuit 805 accepts input data 807 in the form of binary logic signals and converts this data to the appropriate phase and amplitude control signals 811 so as to achieve the desired result of generating multiple deflected high intensity light beams with a minimum amount of intensity variation for each light beam. In the preferred embodiment of the present invention the data conversion unit is a computer memory such as a ROM or EPROM. The input data 807 consists of eight data lines in parallel which input an eight bit data word to the EPROM address input. These address inputs 807 represent the possible data combinations. The data or memory stored in the EPROM consists of the phase and amplitude combinations generated by the computer program in a "look up table" fashion. Therefore, the output of the EPROM via the data lines consists of the unique phase combination for the input data combination. The phase and amplitude combination data as well as the data combination are output via lines 811 to the Phase and Amplitude units 803.

It can be appreciated that many possible means can be employed to generate the phase combinations by the Data Conversion unit 805 that do not utilize a look up table, as used in the preferred embodiment. One such means would be to have a circuit capable of calculating the desired phase combinations as the data combinations were generated in real time. Such an "on line" calculation would not require a look up table at all but would simply calculate the desired phase combination for each data combination as needed while the present invention was operating in real time.

Figure 12:
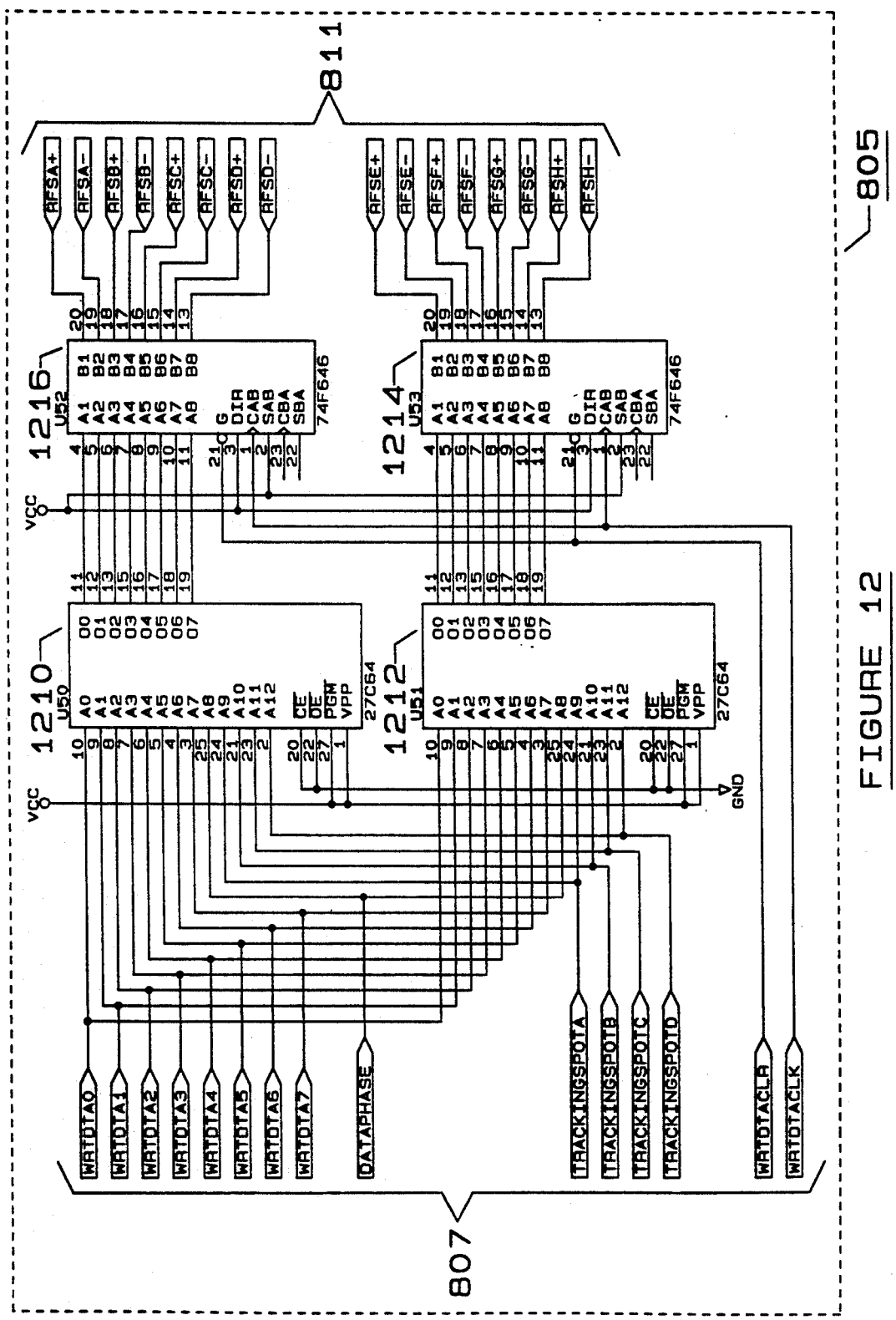
FIG. 12 is a detailed schematic of one embodiment of a data conversion block of the present invention.

FIG. 12 illustrates the Data Conversion unit 805 in detail. The phase combination results of the computer program executed for eight channels is stored in the two EPROMs shown as 1210 and 1212. The input data is made up of eight bits in parallel as WrtDta0-WrtDta7 in the input line 807. The data from line 807 is coupled to the address lines of the EPROMs 1210 and 1212. The data outputs of the EPROMs are coupled to two buffers 1216 and 1214 which drive the output lines 811 which corresponding to RFSA(+/−) to RFSH(+/−) as shown. When the data combination enters via 807 it corresponds to a unique address of the EPROMs which holds the phase combination data for each signal which is on for that data combination. The phase and amplitude combination data is output on lines 811.

Refer to FIG. 12. Each channel as two output signals for phase and signal on/off indication. RFSA(+/−) indicates channel zero (or "1"), and RFSH(+/−) indicates channel seven (or "8"), etc. When both signals are high or both signals are low then no signal is required for that channel for this data word, i.e., a data "0" was encountered. When RFS+ is high and RFS− is low for a given channel the signal is on but not inverted. When RFS+ is low and RSF− is high for a given channel then the signal is on and inverted. It is appreciated that many combinations of the above can be utilized to arrive at the same result.

Figure 9:
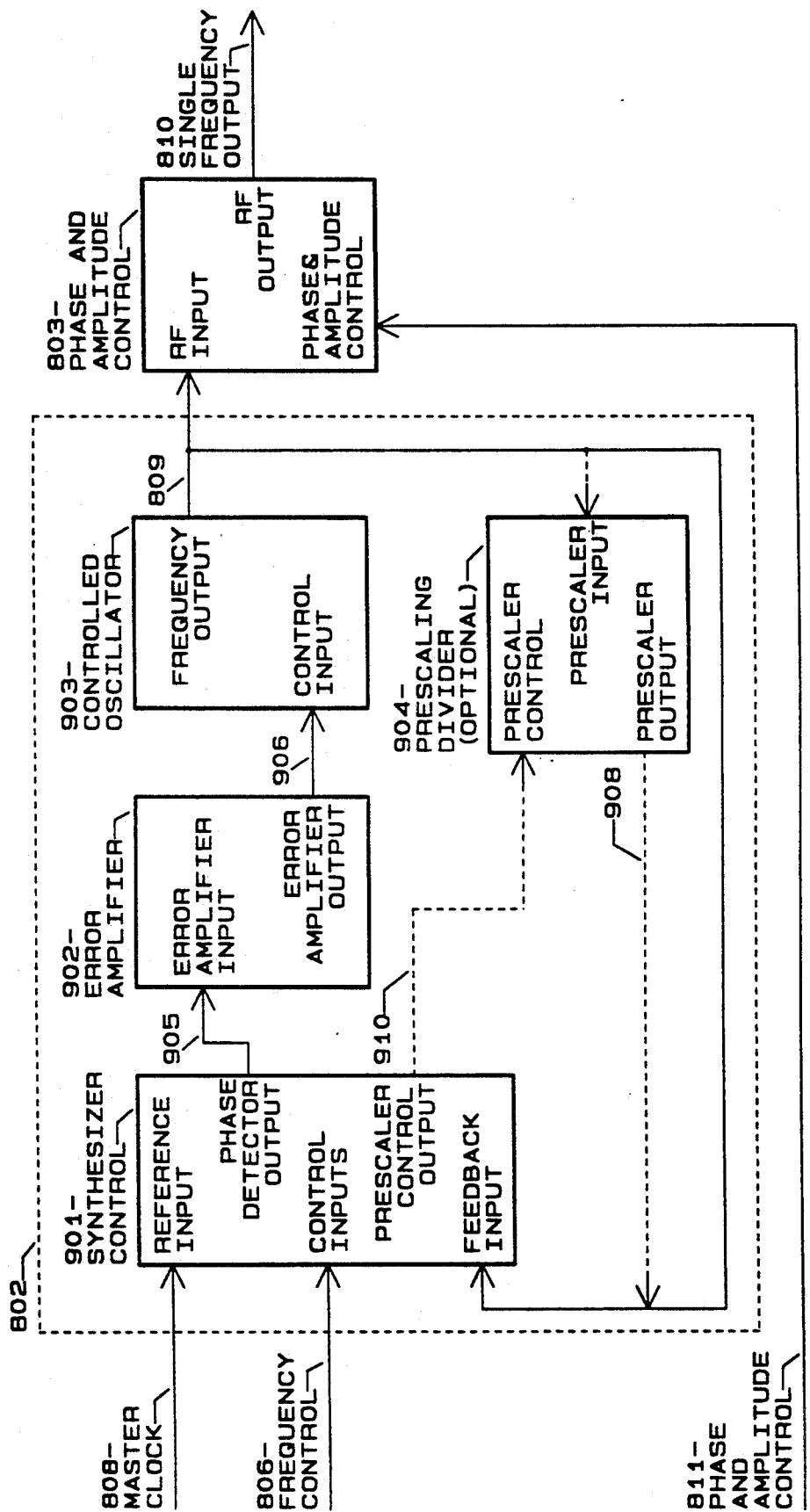
FIG. 9 is a detailed block diagram of one channel of the synthesizer bank of the present invention illustrated in FIG. 8.

Now returning to Frequency Synthesizer 802 shown in detail in FIG. 9 where a particular channel is illustrated. Synthesizer Control circuit 901 contains the necessary control circuits, divider circuits and phase detector to implement a phase locked loop frequency synthesizer. Such phase locked loops are well know in prior art and components are readily available to implement them. Master Clock signal 808 provides a reference signal to the reference input on Synthesizer Control 901. All phase combination data from the Data Conversion unit 805 is relative to the Master Clock signal 808. The Synthesizer Control device used in the preferred embodiment of the present invention is available by Motorola and is part number MC145158.

Additionally provided to Synthesizer Control 901 are several control input signals 806 typically implemented as binary logic signals composed of a serial data signal, a clock signal, and an enable or latching signal. These control input signals 806 may also be implemented with a larger number of parallel logic signals instead of a serial scheme. In any case the control input signals 806 connected to Synthesizer Control 901 allow the main divider in the phase locked loop to be configured such that the frequency of the feedback input signal 809 or 908 is divided by a predetermined number before being presented to the phase detector in Synthesizer Control unit 901. This predetermined number defines the frequency at which the synthesizer will operate.

Refer to FIG. 9. The Synthesizer Control 901 unit can be implemented with a number of commercially available integrated circuits from both domestic and foreign manufacturers (such as Motorola's MC145158). These integrated circuits typically have all the circuitry required to implement a single phase locked loop frequency synthesizer except for an external error amplifier and an external controlled oscillator. Optionally, Synthesizer Control circuit 901 can be implemented with standard logic parts such as TTL, CMOS or ECL circuits or as logic elements on a custom fabricated integrated circuit.

The phase detector output 905 of Synthesizer Control 901 is connected to Error Amplifier 902 by way of the error amplifier input. The error Amplifier 902 performs amplification and compensation including one or more electrical integrators and compensation networks. The Error Amplifier 902 of the present invention is implemented using a well known technique employing a commercially available operational amplifier which is part number LM833.

Refer to FIG. 9. The error amplifier output 906 of the Error Amplifier 902 is in turn connected to Controlled Oscillator 903 by way of the control input of the Controlled Oscillator 903. The Controlled Oscillator 903 can perform a voltage or current to frequency conversion thereby providing a frequency output 809. The Controlled Oscillator of the present invention is selected to be a voltage controlled oscillator or "VCO." This is a well known device and commercially readily available. The component selected for the preferred embodiment is a Vari-L device, part number VCO-118 connected in a well known fashion.

The frequency output 809 of the Controlled Oscillator 903 is optionally connected to a Prescaling Divider 904, by way of the prescaler input, to divide the frequency down to a frequency range which the circuits in Synthesizer Control 901 can accommodate. If Synthesizer Control 901 can directly accommodate frequencies as high as frequency output 809 then Prescaling Divider 904 may be eliminated and frequency output 809 from Controlled Oscillator 903 may be directly connected to the feedback input of Synthesizer Control 901.

Refer to FIG. 9. The connection from the Controlled Oscillator 903 to the frequency output 809 (or prescaler 904 output) to the Synthesizer Control 901 feedback input establishes complete feedback for the phase locked loop thereby allowing the oscillator frequency output of Controlled Oscillator 903 to be both phase and frequency locked to master clock signal 808.

The output frequency 809 represents the single frequency for each channel. At the 809 state the phase for this single frequency has not yet been adjusted. As noted above, the preferred embodiment of the present invention utilizes eight single frequency signals.

For each separate channel, this phase locked frequency output 809 from controlled oscillator 903 is additionally connected to the input of the Phase and Amplitude Control unit 803 which performs the task of creating a particular phase for single frequency output 810 (as directed by the phase combination data) relative to the Master Clock 808 and additionally adjusting the amplitude of single frequency output 810 to some desired level. Phase and amplitude control inputs of the Phase and Amplitude Control unit 803 provide for this phase and amplitude adjustment by means of several analog or digital signals or a combination of both.

In one implementation of the Phase and Amplitude Control unit 803, a double balanced mixer may be used for phase and amplitude control processing whereby a positive control input current would select a relative phase of 0 (zero) degrees and a negative control input current would select a relative phase of 180 degrees. Amplitude control is also accomplished by this design; for example, a low value of control input current at 811 would select a low output signal amplitude at 810 and a high value of control input current at 811 would select a high output signal amplitude at 810. Using such a design a low intensity deflected beam could represent a logical "0" data bit while a high intensity deflected beam could represent a logical "1", or vice-versa.

Similarly two double balanced modulators can be combined with an inverting amplifier to produce a phase modulator circuit for phase and amplitude control 803 which would allow a large number of different phases and amplitudes to be selected with two analog control inputs. Indeed, there are a large number of circuits which can provide phase and amplitude control as required and which would be within the scope of this invention.

Figure 11:
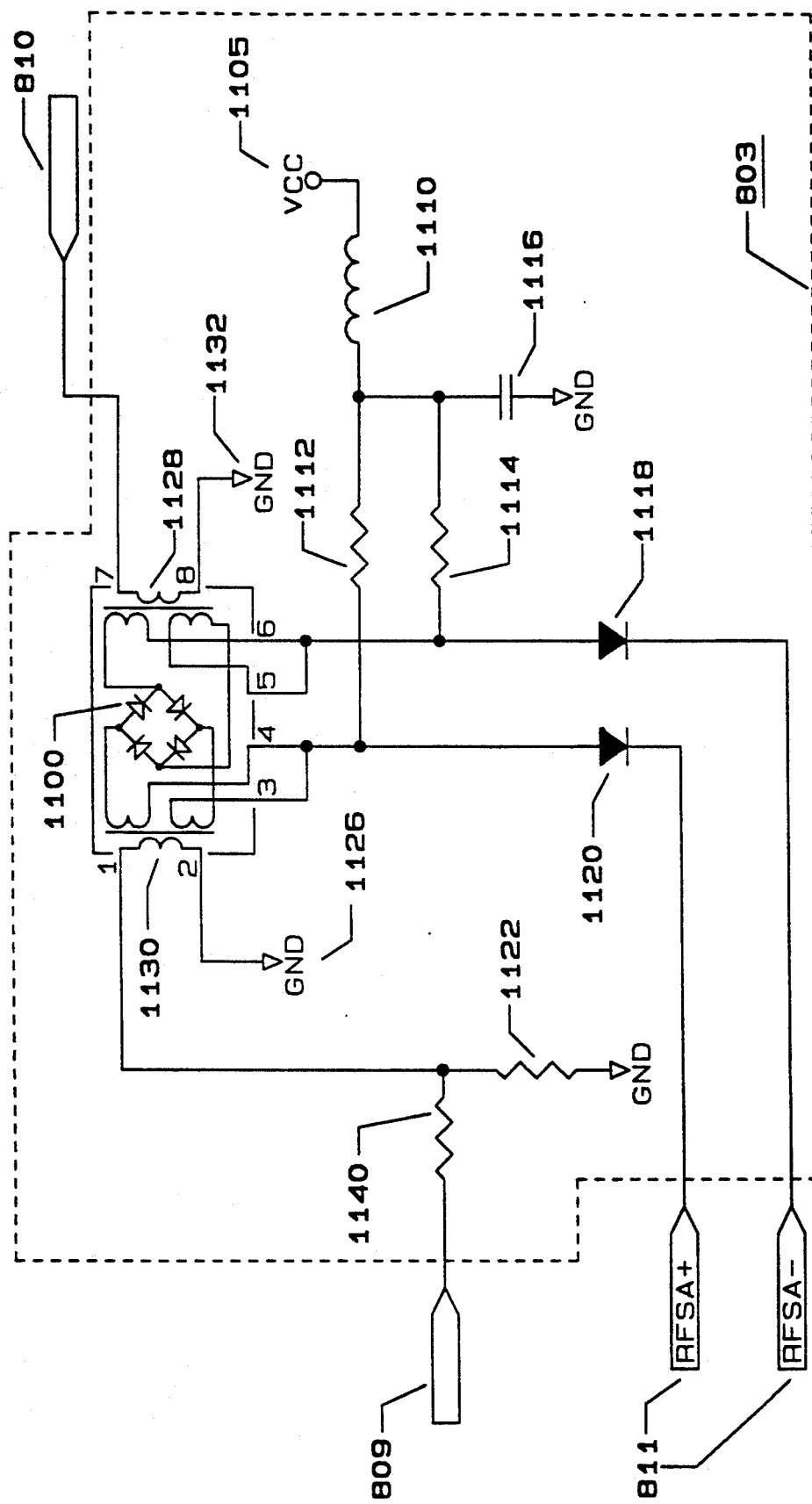
FIG. 11 is a detailed schematic of one embodiment of a phase and amplitude control block of the present invention.

FIG. 11 illustrates the implementation of the Phase and Amplitude Control unit 803 of the preferred embodiment of the present invention for a particular channel, channel A. It is appreciated that the design of FIG. 11 is replicated for each channel of the present invention. The major component of the Phase and Amplitude Control circuit 803 is a double balanced mixer which performs the phase control. The single frequency signal is input at 809 through resistor 1140 which has one end tied to ground through resistor 1122. The signal then enters an outer coil of transformer 1130 which is also tied to ground at point 1126. The other inner coil of the transformer 1130 is coupled to a diode bridge 1100 which is also connected to another inner coil of transformer 1128. The outer coil of transformer 1128 is coupled to ground at point 1132 while the output of the Phase and Amplitude Control 803 is taken from the other end of the outer coil of transistor 1128 at RFA point 810.

Refer to FIG. 11. The inner coil of transformer 1130 is coupled to diode 1120 which is coupled to the positive of the phase data inputs at 811. These are the data signals from the Data Conversion unit 805. The inner coil of transformer 1128 is coupled to diode 1118 which is coupled to the negative of the phase data inputs 811. The other end of the diode 1118 is coupled to a resistor 1114 which is coupled to ground through a capacitor 1116 and also coupled to a inductor 1110 which is coupled to VCC at point 1105. The other end of the diode 1120 is coupled to a resistor 1112 which is coupled to ground through the same capacitor 1116 and also coupled to the inductor 1110 which is coupled to VCC at point 1105.

The circuit of FIG. 11 operates as follows. When both phase control inputs at 811 are high or both low, no signal is output from 810. When the positive of 811 is high and the negative of 811 is low the signal at 810 follows the signal at 809, i.e., no phase shift occurs and the adjustment is 0 degrees. When the positive of 811 is low and the negative of 811 is high then the signal at 810 is the inverse of the signal at 809, i.e., signal 809 has been phase shifted by 180 degrees. In either of the cases the output of the Phase and Amplitude Control unit 803 is from point 810 which goes to the Sum Amplifier 804 of FIG. 8.

Also, as discussed above, amplitude control of the output signal (single frequency) at 810 for each channel can also be accomplished by varying the logical signal inputs at 811. This will control amplitude of the output wave at 810 by effectively turning it off or on. In other embodiments of the present invention it can readily be understood that analog inputs at point 811 could control the amount of input current at the signals of 811 for each channel. This would require an analog based circuit for block 803. Either design produces a signal of higher or lower amplitude for the Sum Amplifier 804 and a higher or lower intensity deflected light beam will result from the AOD 100. Of course, each channel can be separately controlled with regard to both phase and amplitude control data.

Refer again to FIG. 8. For each desired separately deflected light beam 106 through 109 (or more) the circuits of 802 and 803 are repeated so as to generate a separate single frequency at point 810 for each light beam which has a unique channel. All such single frequency outputs 810 for each channel are summed together in Sum Amplifier 804 then amplified and presented to AOD 100. The Sum Amplifier 804 is a well known device in the art. The amplifier design utilized in the preferred embodiment of the present invention takes each channel input from 810 through an amplifier stage utilizing part NE5205. From the amplifier stage, each signal goes through a resistor to a common node where all other channels are coupled together. The output is filtered from this node and then taken at point 104. At this point one summation signal exists for all the input single frequencies.

There may be a requirement in some particular application to have differing combinations of frequencies summed together at different times. One such application would be in the optical medium storage system, as discussed above, where each light beam may correspond to a particular data bit in a parallel data recording scheme. In such a case each light beam would also correspond to a single frequency generated by one set of frequency synthesizer 802 and phase and amplitude control 803 circuits.

The presence of a logical one for each such data bit may be represented by a high relative intensity of the particular light beam representing that data bit and conversely the presence of a logical zero may be represented by a low relative intensity of the particular light beam representing that data bit, or perhaps no intensity at all. A parallel data stream would then be represented by a multiplicity of light beams with each light beam changing from high intensity to low intensity and back corresponding to the logic value of each data bit in the parallel data stream.

Returning to FIG. 8 there are multiple input data signals 807 which are typically composed of multiple binary logic signals which correspond to the desired logical state of each data bit in a parallel data stream. Data conversion circuit 805 converts this data stream into the appropriate phase and amplitude control signals 811 so as to achieve the desired representative pattern of multiple high intensity and low intensity deflected light beams with a minimum amount of intensity variation for each light beam.

As discussed with reference to FIG. 12, Data Conversion circuit 805 may be implemented with a standard memory device such as a random access memory (RAM), read only memory (ROM) or by EPROMs. In such memory device implementation, the input data signals may be connected to the address pins of the memory device and the data output pins would provide the amplitude and phase control signals data for each separate frequency which are in turn connected to the corresponding phase and amplitude control circuits 803. The memory device could then contain the required single frequency phase and amplitude control values for each frequency and for all possible combinations of logic one or logic zero states for all parallel data bits present in the parallel data stream corresponding to input data signals 807.

In view of the foregoing, it will be understood that the present invention provides a means of generating multiple separate frequency signals with each separate frequency signal having a precise frequency and phase relationship to a common reference frequency signal and additionally with each separate frequency signal having said phase relationship adjustable so as to minimize the maximum amplitude and power of a signal composed of the sum of all separate frequency signals.

What is claimed is:

1. An apparatus for producing a multi-frequency signal having reduced intermodulation distortion, said apparatus comprising:

reference signal means for generating a reference signal;

multiple oscillator means for generating a plurality of single frequency signals with a predetermined frequency relationship and a direct phase relationship with said reference signal, said multiple oscillator means coupled to receive said reference signal from said reference signal means;

phase control means for controlling the phase of each of said plurality of single frequency signals to create a plurality of phase controlled single frequency signals, said phase control means controlling the phase of each of said plurality of single frequency signals against said reference signal in order to minimize the maximum amplitude of a summation of said plurality of phase controlled single frequency signals, said phase control means coupled to receive said plurality of single frequency signals from said multiple oscillator means; and means for summing said plurality of phase controlled single frequency signals to produce said multi-frequency signal having a low maximum amplitude while maintaining a high average amplitude, said means for summing coupled to receive said plurality of phase controlled single frequency signals.

2. The apparatus of claim 1 further comprising beam deflecting means for producing multiple output deflected light beams from an incident beam, each of said multiple output deflected light beams corresponding to each of said plurality of phase controlled single frequency signals, said beam deflecting means coupled to receive said multi-frequency signal from said means for summation.

3. The apparatus of claim 2 wherein said beam deflecting means is an acousto-optic deflector means.

4. The apparatus of claim 3 wherein said acousto-optic deflector means is a Bragg Cell having a piezoelectric contact.

5. The apparatus of claim 2 wherein:

said multiple oscillator means are multiple independent phase locked loop frequency synthesizers;

said phase control means comprises a plurality of double balanced mixer circuits to adjust said phase relationships and amplitudes of said plurality of single frequency signals;

said means for summing further comprising an amplifier circuit for increasing the relative power level of said multi-frequency signal;

said reference signal means is a master clock signal;

said beam deflecting means is an acousto-optic deflector means; and said phase control means comprises a computer program to control the phase of each of said plurality of single frequency signals against said reference signal in order to minimize the maximum amplitude while maintaining a high average amplitude of said summation of said plurality of phase controlled single frequency signals.

6. The apparatus of claim 1 wherein said multiple oscillator means are multiple independent phase locked loop frequency synthesizers.

7. The apparatus of claim 1 wherein said phase control means comprises a plurality of double balanced mixer circuits to adjust phase of each of said plurality of single frequency signals.

8. The apparatus of claim 1 wherein said means for summing further comprising an amplifier circuit for increasing the relative power level of said multi-frequency signal.

9. The apparatus of claim 1 wherein said phase control means comprises a computer program to control the phase of each of said plurality of single frequency signals against said reference signal in order to minimize the maximum amplitude while maintaining a high average amplitude of said summation of said plurality of phase controlled single frequency signals.

10. An apparatus for producing a multi-frequency signal having a low maximum power while maintaining a high average power, said apparatus comprising:
reference signal means;
multiple oscillator means for generating a plurality of separate single frequency signals with a predetermined frequency and phase relationship to said reference signal means, said multiple oscillator means commonly coupled to said reference signal means;
conversion means for determining a phase combination for said plurality of separate single frequency signals, said phase combination comprising a set of an adjusted phase relationship for each of said plurality of separate single frequency signals, said phase combination determined to minimize the maximum power while maintaining a high average power of a summation signal composed of a summation of said plurality of separate single frequency signals which are adjusted by said phase combination, said phase combination also comprising amplitude data for each of said plurality of separate single frequency signals;
phase and amplitude control means for independently controlling said phase relationship of each of said plurality of separate single frequency signals against said reference signal means according to said phase combination, said phase and amplitude control means also for independently controlling the amplitude of each of said plurality of separate single frequency signals according to said amplitude data and for further generating a plurality of phase and amplitude controlled separate single frequency signals, said phase and amplitude control means coupled to said multiple oscillator means and also coupled to said conversion means to receive said phase combination; and
means for summing said plurality of phase and amplitude controlled separate single frequency signals to produce said multi-frequency signal having a low maximum power while maintaining a high average power, said means for summing coupled to said phase and amplitude control means.

11. The apparatus of claim 10 wherein said multiple oscillator means are multiple independent phase locked loop frequency synthesizers.

12. The apparatus of claim 10 wherein said conversion means is a data conversion circuit for converting binary logic signals to phase and amplitude control signals so as to maintain a minimum relationship between maximum power and average power in said multi-frequency signal for any combination of logic states for said binary logic signals.

13. The apparatus of claim 10 wherein said conversion means utilizes a computer program to determine said phase combination that minimizes the maximum power while maintaining a high average power of said summation of said plurality of single frequency signals which are being phase controlled.

14. The apparatus of claim 10 wherein said phase and amplitude control means comprises a plurality of double balanced mixer circuits to adjust said phase relationships and amplitudes of said plurality of separate single frequency signals.

15. The apparatus of claim 10 wherein said means for summing further comprising an amplifier circuit for increasing the relative power level of said multi-frequency signal.

16. The apparatus of claim 10 wherein said reference signal means is a master clock signal.

17. The apparatus of claim 10 further comprising an acousto-optic deflector means for producing multiple output deflected light beams from an input light source, each of said multiple output deflected light beams corresponding to each of said plurality of phase and amplitude controlled separate single frequency signals, said acousto-optic deflector coupled to said means for summation to receive said multi-frequency signal.

18. The apparatus of claim 17 wherein said acousto-optic deflector means is a Bragg Cell having a piezoelectric contact.

19. The apparatus of claim 17 wherein:
said multiple oscillator means are multiple independent phase locked loop frequency synthesizers;
said conversion means is a data conversion circuit for converting binary logic signals to phase and amplitude control signals so as to maintain a minimum relationship between maximum power and average power in said multi-frequency signal for any combination of logic states for said binary logic signals;
said phase and amplitude control means comprises a plurality of double balanced mixer circuits to adjust said phase relationships and amplitudes of said plurality of separate single frequency signals;
said means for summing further comprising an amplifier circuit for increasing the relative power level of said multi-frequency signal;
said reference signal means is a master clock signal;
said conversion means utilizes a computer program to determine said phase combination that minimizes the maximum power while maintaining a high average power of said summation of said plurality of single frequency signals which are being phase controlled; and
said acousto-optic deflector means is a Bragg Cell having a piezoelectric contact.

20. In an optical medium data recording and retrieval system having a light emission device, an acousto-optic deflector means to receive light emission from said light emission device, means for generating and controlling a multi-frequency driving signal to said acousto-optic deflector means for producing a plurality of output deflected light beams from said acousto-optic deflector means, compensating and directing means for receiving said plurality of output deflected light beams and for directing said output beams onto said optical medium so that said output beams may record data thereon, wherein the improvement comprising:
reference signal means;
multiple oscillator means for generating a plurality of separate single frequency signals with a predetermined frequency and phase relationship to said reference signal means said multiple oscillator means commonly coupled to said multiple oscillator means;
conversion means for determining a phase combination for said plurality of separate single frequency signals, said phase combination comprising a set of an adjusted phase relationship for each of said plurality of separate single frequency signals, said phase combination determined to minimize the maximum power while maintaining a high average power of a summation of said plurality of separate single frequency signals adjusted by said phase combination, said phase combination also comprising amplitude data for said each of said plurality of separate single frequency signals;

phase and amplitude control means for independently controlling said phase relationship of said each of said plurality of separate single frequency signals against said reference signal means according to said phase combination, said phase and amplitude control means also for independently controlling the amplitude of said each of said plurality of separate single frequency signals according to said amplitude data and for further generating a plurality of phase and amplitude controlled separate single frequency signals, said phase and amplitude control means coupled to said multiple oscillator means and also coupled to said conversion means to receive said phase combination;

means for summing said plurality of phase and amplitude controlled separate single frequency signals to produce said multi-frequency driving signal having low maximum power while maintaining a high average power, said means for summing coupled to said phase and amplitude control means; and said acousto-optic deflector means for producing said plurality of output deflected light beams, each of said plurality of output deflected light beams corresponding to said each of said plurality of phase and amplitude controlled separate single frequency signals, said acousto-optic deflector means coupled to said means for summation to receive said multi-frequency driving signal.

21. The improvement as described in claim 20 wherein said multiple oscillator means are multiple independent phase locked loop frequency synthesizers.

22. The improvement as described in claim 20 wherein said conversion means is a data conversion circuit for converting binary logic signals to phase and amplitude control signals so as to maintain a minimum relationship between maximum power and average power in said multi-frequency driving signal for any combination of logic states for said binary logic signals.

23. The improvement as described in claim 20 wherein said phase and amplitude control means comprises a plurality of double balanced mixer circuits to adjust phase and amplitude of each of said plurality of separate single frequency signals.

24. The improvement as described in claim 20 wherein said means for summing further comprising an amplifier circuit for increasing the relative power level of said multi-frequency driving signal.

25. The improvement as described in claim 20 wherein said reference signal means is a master clock signal.

26. The improvement as described in claim 20 wherein said acousto-optic deflector means is a Bragg Cell having a piezoelectric contact.

27. The improvement as described in claim 20 wherein:

said multiple oscillator means are multiple independent phase locked loop frequency synthesizers;

said conversion means is a data conversion circuit for converting binary logic signals to phase and amplitude control signals so as to maintain a minimum relationship between maximum power and average power in said multi-frequency signal for any combination of logic states for said binary logic signals;

said phase and amplitude control means comprises a plurality of double balanced mixer circuits to adjust phase and amplitude of said each of said plurality of separate single frequency signals;

said means for summing further comprising an amplifier circuit for increasing the relative power level of said multi-frequency signal;

said reference signal means is a master clock signal; and said acousto-optic deflector means is a Bragg Cell having piezoelectric contact.

28. An apparatus for generating a low maximum power, yet high average power, multi-frequency driving signal by summing a plurality of adjusted separate single frequency signals, said multi-frequency driving signal for driving an acousto-optic deflector for use in an optical medium data storage and retrieval system, said apparatus for generating a multi-frequency signal comprising:

(a) a reference signal;

(b) a plurality of channels for producing said plurality of adjusted separate single frequency signals, each of said channels for producing an adjusted separate single frequency signal of said plurality of adjusted separate single frequency signals, said each of said channels comprising:

(1) oscillator means for generating a separate single frequency signal with a predetermined frequency and phase relationship to said reference signal, said oscillator means coupled to said reference signal;

(2) phase and amplitude control means for adjusting the phase of said separate single frequency signal against said reference signal according to phase combination data, said phase and amplitude control means also for adjusting the amplitude of said separate single frequency signal according to amplitude data, said phase and amplitude control means for generating an adjusted separate single frequency signal based on said separate single frequency signal, said phase and amplitude control means coupled to said multiple oscillator means to receive said separate single frequency signal;

(c) conversion means for determining said phase combination data, said phase combination data comprising adjusted phase values, one adjusted phase value for each separate single frequency signal, said phase combination data determined so as to minimize the maximum power value while maintaining a high average power value of a summation of said plurality of separate single frequency signals which are adjusted by said adjusted phase values, said phase combination also comprising said amplitude data, said conversion means coupled to each of said plurality of channels to communicate said phase combination data to each of said phase and amplitude control means;

(d) means for summing said plurality of adjusted separate single frequency signals to produce said multi-frequency driving signal having a low maximum power while maintaining a high average power, said means for summing coupled to each of said plurality of channels to receive the adjusted separate single frequency signal of each of said phase and amplitude control means; and (e) said acousto-optic deflector means for producing a plurality of output deflected light beams, each of said plurality of output deflected light beams corresponding to each of said plurality of adjusted separate single frequency signals, said acousto-optic deflector means coupled to said means for summation to receive said multi-frequency driving signal.

29. An apparatus for generating a low maximum power, yet high average power, multi-frequency driving signal as described in claim 28 wherein for each of said plurality of channels said oscillator means is an independent phase locked loop frequency synthesizer.

30. An apparatus for generating a low maximum power, yet high average power, multi-frequency driving signal as described in claim 28 wherein said conversion means is a data conversion circuit for converting binary logic signals to phase and amplitude control signals so as to maintain a minimum relationship between maximum power and average power in said multi-frequency driving signal for any combination of logic states for said binary logic signals.

31. An apparatus for generating a low maximum power, yet high average power, multi-frequency driving signal as described in claim 28 wherein for each of said plurality of channels said phase and amplitude control means comprises a double balanced mixer circuit to adjust phase and amplitude of said separate single frequency signals.

32. An apparatus for generating a low maximum power, yet high average power, multi-frequency driving signal as described in claim 28 wherein said means for summing further comprising an amplifier circuit for increasing the relative power level of said multi-frequency driving signal.

33. An apparatus for generating a low maximum power, yet high average power, multi-frequency driving signal as described in claim 28 wherein said reference signal is a master clock signal.

34. An apparatus for generating a low maximum power, yet high average power, multi-frequency driving signal as described in claim 28 wherein said acousto-optic deflector means is a Bragg Cell having a piezoelectric contact.

35. An apparatus for generating a low maximum power, yet high average power, multi-frequency driving signal as described in claim 28 wherein:
for each of said plurality of channels said oscillator means is an independent phase locked loop frequency synthesizer;
said conversion means is a data conversion circuit for converting binary logic signals to phase and amplitude control signals so as to maintain a minimum relationship between maximum power and average power in said multi-frequency signal for any combination of logic states for said binary logic signals;
for each of said plurality of channels said phase and amplitude control means comprises a double balanced mixer circuit to adjust phase and amplitude of said separate single frequency signal;
said means for summing further comprising an amplifier circuit for increasing the relative power level of said multi-frequency signal;
said reference signal means is a master clock signal; and
said acousto-optic deflector means is a Bragg Cell having piezoelectric contact.

36. A method for producing a multi-frequency signal having reduced intermodulation distortion, said multi-frequency signal for producing a plurality of deflected light beams, said multi-frequency signal composed of a summation of a plurality of adjusted separate single frequency signals, said method comprising the steps of;

providing a reference signal;
generating said plurality of separate single frequency signals each having a predetermined frequency and phase relationship to said reference signal;
determining a phase combination for said plurality of separate single frequency signals, said phase combination comprising a set of an adjusted phase relationship for each of said plurality of separate single frequency signals so as to minimize the maximum power while maintaining a high average power of a summation of said each of said plurality of separate single frequency signals adjusted by said adjusted phase relationship, said phase combination also comprising amplitude data;
independently controlling and adjusting said phase relationship of each of said plurality of separate single frequency signals against said reference signal means according to said phase combination;
independently controlling and adjusting the amplitude of each of said plurality of separate single frequency signals based on said amplitude data;
summing said plurality of phase and amplitude controlled separate single frequency signals in order to produce said multi-frequency signal having a low maximum power while maintaining a high average power; and
producing said plurality of output deflected light beams by driving an acousto-optic deflector with said multi-frequency signal, each light beam of said plurality output deflected light beams corresponding to each signal of said plurality of phase and amplitude controlled separate single frequency signals.

37. A method for producing a multi-frequency signal having reduced intermodulation distortion as described in claim 36 wherein said step of generating said plurality of separate single frequency signals uses multiple independent phase locked loop frequency synthesizers.

38. A method for producing a multi-frequency signal having reduced intermodulation distortion as described in claim 36 wherein said step of determining a phase combination uses a data conversion circuit for converting binary logic signals to phase and amplitude control signals so as to maintain a minimum relationship between maximum power and average power in said multi-frequency signal for any combination of logic states for said binary logic signals.

39. A method for producing a multi-frequency signal having reduced intermodulation distortion as described in claim 36 wherein said steps of independently controlling and adjusting the phase and amplitude of said plurality of separate single frequency signals utilizes a plurality of double balanced mixer circuits.

40. A method for producing a multi-frequency signal having reduced intermodulation distortion as described in claim 36 wherein said step of summing said plurality of phase and amplitude controlled separate single frequency signals further comprising the step of increasing the relative power level of said multi-frequency signal.

41. A method for producing a multi-frequency signal having reduced intermodulation distortion as described in claim 36 wherein said provided reference signal is a master clock signal.

42. A method for producing a multi-frequency signal having reduced intermodulation distortion as described in claim 36 wherein said acousto-optic deflector is a Bragg Cell having a piezoelectric contact.

43. A method for producing a multi-frequency signal having reduced intermodulation distortion as described in claim 36 wherein:

said step of generating said plurality of separate single frequency signals uses multiple independent phase locked loop frequency synthesizers;

said step of determining a phase combination uses a data conversion circuit for converting binary logic signals to phase and amplitude control signals so as to maintain a minimum relationship between maximum power and average power in said multi-frequency signal for any combination of logic states for said binary logic signals;

said steps of independently controlling and adjusting the phase and amplitude of said plurality of separate single frequency signals utilizes a plurality of double balanced mixer circuits;

said step of summing said plurality of phase and amplitude controlled separate single frequency signals further comprising the step of increasing the relative power level of said multi-frequency signal;

said provided reference signal is a master clock signal; and said acousto-optic deflector is a Bragg Cell having a piezoelectric contact.

* * * * *